(12) United States Patent
Navarro et al.

(10) Patent No.: US 9,741,254 B2
(45) Date of Patent: Aug. 22, 2017

(54) SYSTEM AND METHOD FOR DEFINING AND PREDICTING AIRCRAFT TRAJECTORIES

(71) Applicant: The Boeing Company, Chicago, IL (US)

(72) Inventors: Francisco Navarro, Madrid (ES); Ernesto Hernandez Valls, Madrid (ES); Miguel Vilaplana, Madrid (ES); Piero Chessa, Madrid (ES); Carlos Querejeta Massaveu, Madrid (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/109,319

(22) PCT Filed: Nov. 24, 2014

(86) PCT No.: PCT/IB2014/066292
§ 371 (c)(1),
(2) Date: Jun. 30, 2016

(87) PCT Pub. No.: WO2015/101848
PCT Pub. Date: Jul. 9, 2015

(65) Prior Publication Data
US 2016/0343258 A1    Nov. 24, 2016

(30) Foreign Application Priority Data
Dec. 31, 2013  (EP) ..................................... 13382579

(51) Int. Cl.
*G05D 1/00*   (2006.01)
*G08G 5/00*   (2006.01)
(Continued)

(52) U.S. Cl.
CPC .......... *G08G 5/0052* (2013.01); *G01C 21/20* (2013.01); *G06Q 10/047* (2013.01); *G06Q 50/30* (2013.01);
(Continued)

(58) Field of Classification Search
None
See application file for complete search history.

(56) References Cited

U.S. PATENT DOCUMENTS 8,600,675 B1 * 12/2013 Borghese ............... G01C 23/00
                                                    701/528
8,942,914 B2 *  1/2015 Subbu .................. G08G 5/0013
                                                    701/120

(Continued)

FOREIGN PATENT DOCUMENTS

EP        2667274 A1    11/2013

OTHER PUBLICATIONS

Steiner, et al.; "Integration of Probabilistic Weather Information with Air Trafficmanagement Decision Support Tools: A Conceptual Vision for the Future"; 13th Conference on Aviation, Range and Aerospace Meteorology; Jan. 21, 2008; New Orleans, Louisiana; section 2.1; a novel.

(Continued)

*Primary Examiner* — Nicholas Kiswanto
*Assistant Examiner* — Kenny A Taveras
(74) *Attorney, Agent, or Firm* — Miller, Matthias & Hull LLP

(57) ABSTRACT

The method of the present invention comprises acquiring input data of both aircraft performance characteristics and atmospheric data, and defining trajectory parameters to which the aircraft trajectory must be subjected, the method further comprising defining aircraft trajectory parameters; acquiring a plurality of atmospheric forecast ensembles;

(Continued)

calculating a predicted trajectory from each atmospheric forecast of an atmospheric forecast ensemble, said predicted trajectory having associated information regarding a certain figure of merit of the aircraft trajectory, wherein an ensemble of predicted trajectories is obtained from each atmospheric forecast ensemble, each predicted trajectory of the ensemble of predicted trajectories having an associated probability derived from the probability of each atmospheric forecast within an atmospheric forecast ensemble; the system of the present disclosure comprising all the necessary equipment to carry out the method of the present disclosure.

11 Claims, 31 Drawing Sheets

(51) Int. Cl.
  *G01C 21/20* (2006.01)
  *G06Q 10/04* (2012.01)
  *G06Q 50/30* (2012.01)

(52) U.S. Cl.
  CPC ......... *G08G 5/0034* (2013.01); *G08G 5/0091* (2013.01); *G08G 5/0095* (2013.01)

(56) References Cited

U.S. PATENT DOCUMENTS

| | | | | |
|---|---|---|---|---|
| 9,117,368 B2* | 8/2015 | Agarwal | G08G 5/0039 |
| 9,177,480 B2* | 11/2015 | Subbu | G08G 5/0013 |
| 9,257,048 B1* | 2/2016 | Offer | G08G 5/0021 |
| 9,361,804 B2* | 6/2016 | Mere | G08G 5/003 |
| 9,536,435 B1* | 1/2017 | Shay | G08G 5/045 |
| 9,558,670 B1* | 1/2017 | Sheth | G08G 5/0013 |
| 2008/0140273 A1* | 6/2008 | Deker | G05D 1/0055 701/14 |
| 2009/0204277 A1* | 8/2009 | Coulmeau | G01C 23/00 701/3 |
| 2010/0305781 A1* | 12/2010 | Felix | G05D 1/101 701/3 |
| 2012/0083946 A1* | 4/2012 | Maldonado | G06Q 10/06 701/3 |
| 2012/0116614 A1* | 5/2012 | Torres | G08G 5/0013 701/3 |
| 2012/0290154 A1* | 11/2012 | Lopez Leones | G08G 5/0021 701/3 |
| 2013/0073120 A1* | 3/2013 | Bailey | G08G 5/0013 701/2 |
| 2013/0085661 A1* | 4/2013 | Chan | G05D 1/104 701/122 |
| 2013/0085672 A1* | 4/2013 | Stewart | G08G 5/003 701/528 |
| 2013/0317670 A1* | 11/2013 | Magana Casado | G05D 1/101 701/3 |
| 2013/0317671 A1* | 11/2013 | Magana Casado | G05D 1/101 701/3 |
| 2013/0317672 A1* | 11/2013 | Magana Casado | G08G 5/0013 701/3 |
| 2014/0172301 A1* | 6/2014 | Navarro | G01W 1/00 702/3 |
| 2014/0229094 A1* | 8/2014 | La Civita | G08G 5/0008 701/120 |
| 2014/0257598 A1* | 9/2014 | Bailey | G05D 1/101 701/3 |
| 2014/0277853 A1* | 9/2014 | Castillo-Effen | G08G 5/0095 701/3 |
| 2014/0336932 A1* | 11/2014 | Leones | G08G 5/003 701/528 |
| 2014/0343759 A1* | 11/2014 | Garrido-Lopez | G08G 5/0052 701/3 |
| 2015/0057915 A1* | 2/2015 | La Civita | G08G 5/0026 701/120 |
| 2015/0170523 A1* | 6/2015 | La Civita | G01C 21/20 701/120 |
| 2015/0338853 A1* | 11/2015 | Casado Magana | G05D 1/0676 701/5 |
| 2016/0104382 A1* | 4/2016 | Besada Portas | G08G 5/0039 701/540 |
| 2016/0171895 A1* | 6/2016 | Scharl | G08G 5/0021 701/4 |
| 2016/0229554 A1* | 8/2016 | Kawalkar | G01C 23/005 |
| 2016/0257420 A1* | 9/2016 | Gallo Olalla | G05D 1/0005 |
| 2016/0343258 A1* | 11/2016 | Navarro | G01C 21/20 |
| 2017/0018192 A1* | 1/2017 | Borgyos | G08G 5/0039 |
| 2017/0030734 A1* | 2/2017 | Shafaat | G01C 23/005 |
| 2017/0061804 A1* | 3/2017 | Navarro Felix | G08G 5/0034 |
| 2017/0069214 A1* | 3/2017 | Dupray | G08G 5/0069 |

OTHER PUBLICATIONS

Casado, et al.; "Identification and Initial Characterization of Sources of Uncertainty Affecting the Performance of Future Trajectory Management Automation Systems"; ATACCS '2012 Posters; May 29, 2012; pp. 170-175; XP007922752; London.

Steiner, et al.; "Translation of Ensemble-Based Weather Forecasts into Probabilistic Air Traffic Capacity Impact"; Digital Avionics Systems Conference; Oct. 23, 2009; pp. 206-1; XP031575956.

Bresada, et al.; "Automated Aircraft Trajectory Prediction Based on Formal Intent-Related Language Processing"; IEEE Transactions on Intelligent Transportation Systems, IEEE, Piscataway, NJ; vol. 14, No. 3; pp. 1067-1082; Sep. 1, 2013.

Alan, et al.; "Performance of Trajectory Models with Wind Uncertainty"; AIAA Modeling and Simulation Technologies Conference; Aug. 10, 2009; XP055125738; Reston, Virginia;.

Krozel; "Survey of Weather Impact Models Used in Air Traffic Management"; 10th AIAA Aviation Technology, Integration and Operations (ATIO) Conference/13th AIAA/ISSMO Multidisciplinary Analysis Optimization Conference; Sep. 13-15, 2010; Fort Worth, Texas; vJanuary 1, 2010; pp. 1-24; XP008170173.

International Search Report for related International Application No. PCT/IB2014/066292; report dated Mar. 24, 2016.

European Search Report for related European Application No. EP13382579; report dated Jul. 1, 2014.

\* cited by examiner

| | | | |
|---|---|---|---|
| Independent variable | | $t$ | time |
| State variables | $X$ | $\lambda$ | longitude |
| | | $\varphi$ | latitude |
| | | $h$ | altitude |
| | | $m$ | mass |
| | | $v_{TAS}$ | true airspeed |
| | | $\chi_{TAS}$ | bearing |
| Control variables | $u$ | $\delta_T$ | throttle |
| | | $\gamma_{TAS}$ | path angle |
| | | $\mu_{TAS}$ | bank angle |
| Configuration variables | $\Delta$ | $\delta_{HL}$ | high lift |
| | | $\delta_{SB}$ | speed brakes |
| | | $\delta_{LG}$ | landing gear |
| | | $\delta_{AR}$ | altitude reference |
| Environmental (Earth Model) variables | $E$ | $\delta = p/p_0$ | pressure ratio |
| | | $\theta = T/T_0$ | temperature ratio |
| | | $V$ | geopotential |
| | | $g$ | gravity |
| | | $w_1$ | wind component - east |
| | | $w_2$ | wind component - north |
| | | $w_3$ | wind component - zenith |
| Aircraft performance variables | $A$ | $L$ | lift |
| | | $D$ | drag |
| | | $T$ | thrust |
| | | $F$ | fuel flow |

FIG. 15

| A | L | $f(\delta, M, \alpha, \delta_{HL}, \delta_{SB})$ | Lift | Aerodynamics |
|---|---|---|---|---|
| | D | $f(\delta, M, \alpha, \delta_{HL}, \delta_{SB}, \delta_{LG})$ | Drag | |
| | T | $f(\delta, M, \delta_T)$ | Thrust | Propulsion |
| | F | $f(\delta, \theta, M, \delta_T)$ | Fuel consumption | Weight |

FIG. 16

| E | V | $f(\varphi, h)$ | Geopotential | Geoid | |
|---|---|---|---|---|---|
| | g | | Gravity (ellipsoidal) | | |
| | $\delta = p/p_0$ | | Pressure ratio | Pressure | Atmosphere |
| | $\theta = T/T_0$ | | Temperature ratio | Temperature | |
| | $w_1$ | $f(\lambda, \varphi, h, t)$ | Wind component - east | Horizontal wind | |
| | $w_2$ | | Wind component - north | | |
| | $w_3$ | | Wind component - zenith | Vertical wind | |

FIG. 17

| | | | | | |
|---|---|---|---|---|---|
| Motion | Lateral | $\mu_{TAS}$ | Lateral attitude | | Geometry |
| | | $\chi_{TAS}$ | | | |
| | | $\lambda, \varphi$ | 2D Geometry | 3D Geometry | |
| | | $r$ | | | |
| | | $h$ | Altitude | | |
| | Longitudinal | $\gamma_{TAS}$ | Longitudinal attitude | | Kinematics |
| | | $v_{TAS}\sin\gamma_{TAS}$ | Vertical speed | | |
| | | $dv_{TAS}/dh$ | Acceleration | | |
| | | $v_{TAS}\cos\gamma_{TAS}$ | Horizontal speed | | |
| | | $v_{TAS}$ | Absolute speed | | |
| | | $t$ | Timing | | |
| | Propulsive | $\delta_T$ | Propulsive actions | | Dynamics |
| | | $T$ | | | |
| | | $F$ | Gravitational actions | | |
| | | $m; W$ | | | |
| | Aerodynamic | $L$ | Aerodynamic actions | | |
| | | $D$ | | | |
| Configuration | High-lift | $\delta_{HL}$ | Aerodynamic configuration | | |
| | Speed brakes | $\delta_{SB}$ | | | |
| | Landing gear | $\delta_{LG}$ | | | |
| | Altitude reference | $\delta_{AR}$ | Configuration of altitude reference | | |

FIG. 18

| | P | Predicted position at time t | Time-coincident |
|---|---|---|---|
| Spatially-correspondent | A | Actual position at time t | |
| | N | Nominal position (over the predicted trajectory) nearest to the actual position | |

FIG. 19

| Predicted | Actual | Nominal | TP Error concept | Metric |
|---|---|---|---|---|
| $t^P$ | $t^A = t^P$ | $t^N$ | Along-track error - time (ATET) | $ATET = t^N - t^P$ |
| $r^P$ | $r^A$ | $r^N$ | Along-track error - distance (ATER) | $ATER = r^N - r^P$ |
| $\lambda^P, \varphi^P$ | $\lambda^A, \varphi^A$ | $\lambda^N, \varphi^N$ | Cross-track error (XTE) | $XTE = \overline{N'A'}_2^{TND}$ |
| $h^P$ | $h^A$ | $h^N$ | Vertical error (VE) | $VE = h^A - h^N$ |

FIG. 20

| Predicted | Actual | Nominal | TP Error concept | Metric |
|---|---|---|---|---|
| | $\chi_{TAS}^{A}$ | $\chi_{TAS}^{N}$ | Bearing error (BE) | $BE=\chi_{TAS}^{A}-\chi_{TAS}^{N}$ |
| | $\gamma_{TAS}^{A}$ | $\gamma_{TAS}^{N}$ | Path angle error (PAE) | $PAE=\gamma_{TAS}^{A}-\gamma_{TAS}^{N}$ |
| | $\mu_{TAS}^{A}$ | $\mu_{TAS}^{N}$ | Bank angle error (BAE) | $BAE=\mu_{TAS}^{A}-\mu_{TAS}^{N}$ |
| | $v_{TAS}^{A}$ | $v_{TAS}^{N}$ | Speed error (SE) | $SE=v_{TAS}^{A}-v_{TAS}^{N}$ |
| $m^{P}$ | $m^{A}$ | $m^{N}$ | Fuel consumption error (FE) | $FE=m^{A}-m^{P}$ |

FIG. 21

| Observed | Predicted | AM Error concept | Metric |
|---|---|---|---|
| $p^A$ | $p^N$ | Pressure error (PE) | $PE = p^A - p^N$ |
| $T^A$ | $T^N$ | Temperature error (TE) | $TE = T^A - T^N$ |
| $w_E^A$ | $w_E^N$ | East wind error (EWE) | $EWE = w_E^A - w_E^N$ |
| $w_N^A$ | $w_N^N$ | North wind error (NWE) | $NWE = w_N^A - w_N^N$ |
| $w_Z^A$ | $w_Z^N$ | Zenith wind error (ZWE) | $ZWE = w_Z^A - w_Z^N$ |

FIG. 22

| Trajectory-related applications | Trajectory-related functions | Trajectory-related aspects |
|---|---|---|
| • Air vehicle performance computation tools<br>• Procedure design tools<br>• Flight planning (AOC/FOC)<br>• Traffic flow management tools (ATFM)<br>• Flight data processing systems (FPDS)<br>• Mid-term conflict detection systems (CD)<br>• Prediction of wake vortex encountering<br>• Conflict resolution advisors (CR)<br>• Sequencing & scheduling (S&S)<br>• Sense & act (S&A)<br>• Collision avoidance (TCAS/ACAS)<br>• Departure managers (DMAN)<br>• Arrival managers (AMAN)<br>• Enroute managers (EMAN)<br>• Electronic Flight Bags (EFB)<br>• Flight management systems (FMS)<br>• Flight control systems (FCS)<br>• UAS Ground Control Stations (GCS)<br>• Mission command and control systems (C2)<br>• Trajectory-based sensors & payloads<br>• Flight simulators<br>• Traffic simulation tools<br>• Battle simulation tools<br>• Trajectory analysis tools<br>• Etc... | • Trajectory modeling<br>• Trajectory description<br>• Trajectory prediction<br>• Trajectory optimization<br>• Trajectory compression<br>• Trajectory encryption/ authentication<br>• Trajectory sharing/exchange<br>• Trajectory translation/emulation<br>• Trajectory negotiation<br>• Trajectory execution (GNC)<br>• Trajectory reverse-engineering<br>• Etc... | • Position<br>• Time<br>• Speed<br>• Attitude<br>• Fuel consumption<br>• Noise & emissions<br>• Fuel vs. time efficiency<br>• Safety margins<br>• Etc... |

FIG. 23

| | Figure of merit (FOM) | | | | | | | | | | | | | | | | | | | | | |
|---|---|---|---|---|---|---|---|---|---|---|---|---|---|---|---|---|---|---|---|---|---|---|---|
| | Single trajectory | | | | | | | | | | | | | | | | | | | Multiple trajectories | | | |
| | Merit at end-point | | | | | | | | | | Merit of the whole trajectory | | | | | | | | | Merit at end point | Merit of the whole trajectory | | |
| | fuel burnt | flight time | cost (time vs. fuel cost) | range | 2D position | altitude | 3D position | 4D position | Speed | Attitude | wake vortex | ATER | ATET | XTE | VEE | SEE | BAE | PAE | | fuel burnt | noise | emissions | conflictivity |
| | $\Delta m = m_n - m_0$ | $\Delta t = t_n - t_0$ | $CI \cdot \Delta t - \Delta m$ | $\Delta r = r_n - r_0$ | $(\lambda_n, \varphi_n)$ | $h_n$ | $(\lambda_n, \varphi_n, h_n)$ | $(\lambda_n, \varphi_n, h_n, t_n)$ | $V_{TAS}$ | $(\chi_{TAS,0}, \mu_{TAS,0}, \gamma_{TAS,0})$ | $f(\gamma_{TAS,0}, \delta_H, L_0, \delta_{SB,0}, \delta_{LG,0}, w_0)$ | r | t | $(\lambda, \varphi)$ | $V_T A S$ | $\chi_T A S$ | $\mu_T A S$ | $\gamma_T A$ | | $\Sigma\Delta m^k$ | $f(ATER^k, XTE^k, VE^k, T^k, \delta_{HL}^k, \delta_{SB}^k, \delta_{LG}^k, w^k)$ | $f(\Sigma\Delta m^k, w^k)$ | $(ATER^k, XTE^k, VE^k)$ |
| Air vehicle performance computation tools | X | X | X | X | | X | | | | | | | | | | | | | | | | | |
| Procedure design tools | | | | X | X | X | X | | | | | X | | X | X | | | | | X | | | |
| Flight planning (AOC/FOC) | X | X | X | X | X | X | X | | X | | | X | X | X | X | | | | | | | | |
| Traffic flow management tools (ATFM) | | X | | | | | | | | | | | | | | | | | | | | | X |
| Flight data processing systems (FPDS) | | X | | | X | X | X | X | | | | X | X | X | X | | | | | | | | X |
| Mid-term conflict detection systems (CD) | | | | | | | | | | | | X | | X | X | | | | | | | | |
| Prediction of wake vortex encountering | | | | | | | X | | | | X | X | | X | X | | | | | | | | |
| Conflict resolution advisors (CR) | | | | | X | X | X | | | | | | | | | | | | | | | | |
| Sequencing & scheduling (S&S) | | X | | | | | | X | | | | | | | | | | | | | | | |
| Sense & act (S&A) | | | | | X | X | X | | | | | X | | X | X | | | | | | | | |
| Collision avoidance (TCAS/ACAS) | | | | | | | | | | | | | | | | | | | | | | | |

FIG. 24a

| | Figure of merit (FOM) | | | | | | | | | | | | | | | | | | | | |
|---|---|---|---|---|---|---|---|---|---|---|---|---|---|---|---|---|---|---|---|---|---|
| | Single trajectory | | | | | | | | | | | | | | | | | Multiple trajectories | | | |
| | Merit at end-point | | | | | | | | | Merit of the whole trajectory | | | | | | | | Merit at end point | Merit of the whole trajectory | | |
| | fuel burnt | flight time | cost (time vs. fuel cost) | range | 2D position | altitude | 3D position | 4D position | Speed | Altitude | wake vortex | ATER | ATET | XTEE | VEE | SBE | BAE | PAE | fuel burnt | noise | emissions | conflictivity |
| | $\Delta m = m_n - m_0$ | $\Delta t = t_0 - t_0$ | $Cl \cdot \Delta t \cdot \Delta m$ | $\Delta r = r_n - r_0$ | $(\lambda_n, \varphi_0)$ | $h_n$ | $(\lambda_n, \varphi_0, h_n)$ | $(\lambda_n, \varphi_0, h_n, t_n)$ | $V_{TAS}$ | $f(\chi_{TAS,n}, \mu_{TAS,n}, \gamma_{TAS,n})$ | $f(V_{TAS,n}, \delta_{HL,n}, \delta_{SB,n}, \delta_{LG,n}, W_n)$ | $r$ | $t$ | $(\lambda, \varphi)$ | $h$ | $V_T A S$ | $\chi_T A S$ | $\mu_T A S$ $\gamma_T A S$ | $\Sigma \Delta m^k$ | $f(ATER^k, XTE^k, VE^k, T^k, \delta_{in}^k, \delta_{SB}^k, \delta_{LG}^k, W^k)$ | $f(\Sigma \Delta m^k, W^k)$ | $(ATER^k, XTE^k, VE^k)$ |
| Departure managers (DMAN) | x | | x | | | | x | x | | | | | | | | | | | | | | |
| Arrival managers (AMAN) | x | | x | | | | x | x | | | | | | | | | | | | | | |
| Enroute managers (EMAN) | x | | x | | | | x | x | | | | | | | | | | | | | | |
| Electronic Flight Bags (EFB) | x | x | x | x | x | x | x | x | x | | | | | | | | | | | | | |
| Flight management systems (FMS) | x | x | x | x | x | x | x | x | | | | x | x | x | x | | | | | | | |
| Flight control systems (FCS) | | | | | | | | | | | | x | x | x | x | x | x | x | | | | |
| UAS Ground Control Stations (GCS) | x | x | x | x | x | x | x | x | x | | | x | x | x | x | | x | x | | | | |
| Mission command and control systems (C2) | | x | | x | x | x | x | x | x | | | | | | | | | | x | | | |
| Trajectory-based sensors & payloads | | x | | | | | | | | | | x | x | x | x | x | x | x | | | | |
| Flight simulators | | | | | | | | | | | | x | x | x | x | x | x | x | | | | |
| Traffic simulation tools | | x | | | x | x | x | x | x | | | x | x | x | x | | | | | | | x |
| Battle simulation tools | | x | | | x | x | x | x | x | | | x | x | x | x | | | | | | | |
| Trajectory analysis tools | x | x | x | x | x | x | x | x | x | x | x | x | x | x | x | | x | x | x | x | x | x |

FIG. 24b

| Aspect of interest to the R-DST | FOM definition (z) | Dimensions of FOM value |
|---|---|---|
| Fuel burnt | $\Delta m = m_n - m_0$ | 1 (univariate) |
| Arrival time at given fix (flight time) | $\Delta t = t_n - t_0$ | 1 (univariate) |
| Cost index (time cost vs. fuel cost) | $CI \cdot \Delta t - \Delta m$ | 1 (univariate) |
| Range (horizontal distance covered) | $\Delta r = r_n - r_0$ | 1 (univariate) |
| 2D position at given time or fix | $(\lambda_n, \varphi_n)$ | 2 (bivariate) |
| Altitude at given time or fix | $h_n$ | 1 (univariate) |
| 3D position at given time or fix | $(\lambda_n, \varphi_n, h_n)$ | 3 (trivariate) |
| 4D position at given time or fix | $(\lambda_n, \varphi_n, h_n, t_n)$ | 4 (tetravariate) |
| Speed at given fix | $v_{TAS,n}$ | 1 (univariate, e.g. IAS, CAS, Mach, etc) |
| Attitude | $\chi_{TAS,n}, \mu_{TAS,n}, \gamma_{TAS,n}$ | 3 (trivariate) |
| Wake vortex at given time or fix | Model of $v_{TAS,n}, \delta_{HL,n}, \delta_{SB,n}, \delta_{LG,n}, w_n$ | N (N-variate; as many parameters as required by the wake vortex model) |

FIG. 25

| Trajectory selection criterion (TSC) | | | |
|---|---|---|---|
| MEAN | MODE | MEDIAN | x-CENTILE |
| $E[z]=\Sigma z_i/q$ | more frequent | 50% centile | x% centile |

FIG. 26

| Measures of FOM dispersion | Notation | Compact expression |
|---|---|---|
| Probability distribution function (PDF) | $\{e_i\}\ i=\{1,...,q\}$ | PDF(e) |
| Standard deviation (STD) | $STD=[\Sigma(e_i-MEAN)^2/n]^{1/2}$ | $E[(e-E[e])^2]^{1/2}$ |
| Max absolute error (MAE) | $MAE=\max\{e_i^2\}$ | $\|e\|_\infty$ |
| Sum of square errors (SSE) | $SSE=\Sigma e_i^2$ | $e^T e$ |
| Root-mean square (RMS) | $RMS=(SSE/n)^{1/2}$ | $(e^T e/n)^{1/2}$ |

FIG. 27

| Aspect of interest to the R-DST | FOM definition | z | Dimensions of FOM value |
|---|---|---|---|
| 2D position all over the trajectory | [ATER,XTE] | $(\lambda,\varphi)$ | 2 (bivariate) |
| Altitude all over the trajectory | VE | H | 1 (univariate) |
| 3D position all over the trajectory | [ATER,XTE,VE] | $(\lambda,\varphi,h)$ | 3 (trivariate) |
| 4D position all over the trajectory | [ATER,XTE,VE,ATET] | $(\lambda,\varphi,h,t)$ | 4 (tetravariate) |
| Speed all over the trajectory | SE | $v_{TAS}$ | 1 (univariate, e.g. IAS, CAS, Mach, etc) |
| Attitude all over the trajectory | [BE,PAE,BAE] | $\chi_{TAS}, \mu_{TAS}, \gamma_{TAS}$ | 3 (trivariate) |

FIG. 28

| Interface | Information item exchanged | Description |
|---|---|---|
| 1 | 4D AM domain | 4D domain for which atmospheric predictions are required. Essentially it is a 4D cube of the form $[\lambda_1,\lambda_2]\times[\varphi_1,\varphi_2]\times[h_1,h_2]\times[t_1,t_2]$ that encloses the operational volume of airspace and timeframe within which predicted trajectories are required. |
| 5 | AV id | This input identifies the type of AV for which predicted trajectories are required. The APM model will search in its database and setup the corresponding APM characteristics if found, or suggest using a synonym, if available. |
| 7 | Aircraft intent (AI) | Data structure containing the AIDL description of the trajectory to be computed, i.e. the aircraft intent |
| 7 | Initial conditions (IC) | Data structure containing all known aspects of the AV state vector at the beginning of the trajectory computation process: $u(t_0)=u_0, \; X(t_0)=X_0, \; \dot{X}(t_0)=\dot{X}_0$ |
| 8 | Compute | Command that triggers the computation process based on current AM, APM, AIDL and IC instances setup in the TC infrastructure |
| 8 | Predicted trajectory | Data structure containing the output of the TC process, i.e., the predicted trajectory T as a sequence of extended AV state vectors: $T=\{Y_j\} \; j=\{1,...,n\}$ |

FIG. 29a

| Interface | Information item exchanged | Description |
|---|---|---|
| 13 | Randomization metadata | The information referred to by randomization metadata is twofold:<br>- Data structure containing the parameters that can be randomized along with their corresponding ranges. It can be a summary or a consolidation of the randomization metadata exchanged through interfaces 9, 10, 11 and 12. See Figures 30a and 30b for further details.<br>- A measure of the computational complexity associated with the current randomization configuration setup; e.g. number of trajectory runs needed, estimate of computation time, etc. |
| 13 | Randomization configuration | Data structure containing the randomization options that the randomization engine will use to trait stochastic parameters. Essentially the randomization configuration consists on a set of flags signaling which of the stochastic parameters shall be randomized and additional information defining the discretization of their corresponding range of possible values. Additionally, the randomization configuration might contain options to help the R-DST handling/limiting the computational complexity inherent to stochastic TP. The R-DST shall use this information to explore the sensitivity of the trajectory to the different stochastic parameters of interest in each case. |
| | FOM | Function that computes the FOM of interest to the R-DST. It can be any of the FOMs surveyed in Figures 25 and 28 or other TBD. |
| | TSC | Trajectory selection criterion used to derive a central value of the FOM distribution and the corresponding RPT as defined in Figure 26. It can be any of the criteria included in Figure 26 or other TBD. |
| 13 | Robust predicted trajectory | Data structure containing the output of the S-TP process, i.e., RPT $T_R$ as a sequence of extended AV state vectors:<br>$T_R = \{Y_{R,j}\} \quad j=\{1,...,n\}$ |

FIG. 29b

| Interface | Information Item exchanged | Description |
|---|---|---|
| 8 | Compute | Explained in Figures 29a and 29b |
| | Predicted trajectory | Explained in Figures 29a and 29b |
| 9 | AI randomization metadata | Data structure containing the information related to the randomization of aircraft intent, i.e. the parameters encompassed by vector $\delta_{AI}$, along with their corresponding ranges:<br>[E1] $\delta_{AI} \in [\delta_{AI,1}, \delta_{AI,2}]$<br>E.g.:<br>[E2] $\delta_{AI} = \begin{bmatrix} a_1 \\ a_2 \\ \vdots \\ a_z \end{bmatrix}$    $a_1$=trigger_capture_accuracy $\in [-0.1, 0.3]$ s<br>                               $a_2$=lateral_continuity_level $\in \{0,1,2\}$<br>                               $a_3$=vertical_continuity_level $\in \{0,1,2\}$<br>                               etc...<br>$\{a_1,...,a_z\}$ being the stochastic parameters designed to randomize the AI description, e.g. trigger capture accuracy, L1/L2/V1 softening, etc. |
| | $\delta_{AI}$ | Vector of values given the RE to the stochastic parameters associated with the aircraft intent for the current trajectory computation run |
| 10 | AM randomization metadata | Data structure containing the information related to the randomization of the atmosphere model, i.e. the parameters encompassed by vector $\delta_{AM}$, along with their corresponding ranges:<br>[E3] $\delta_{AM} \in [\delta_{AM,1}, \delta_{AM,2}]$<br>E.g. In the approach proposed for probabilistic atmospheric forecast based on ensembles the randomization of AM is controlled by a single discrete parameter i, which is the index of the ensemble member, i.e.:<br>[E4] $\delta_{AM} = [i]$;              $i \in [1,...,q]$ |
| | $\delta_{AM}$ | Vector of values given the RE to the stochastic parameters associated with the atmosphere model for the current trajectory computation run |

FIG. 30a

| Interface | Information item exchanged | Description |
|---|---|---|
| 11 | APM randomization metadata | Data structure containing the information related to the randomization of the APM, i.e. the parameters encompassed by vector $\delta_{APM}$, along with their corresponding ranges:<br><br>[E5] $\delta_{APM} \in [\delta_{APM,1}, \delta_{APM,2}]$<br><br>E.g. a simple way to randomize the APM could be by distorting the lift, drag, thrust and fuel coefficients computed deterministically by a random % amount, known to lie within certain limits, i.e.:<br><br>[E6] $\delta_{APM} = \begin{bmatrix} \Delta C_L \\ \Delta C_D \\ \Delta C_T \\ \Delta C_F \end{bmatrix}$    $\Delta C_L \in [-1.0\%, 1.5\%]$<br>$\Delta C_D \in [-2.0\%, 1.4\%]$<br>$\Delta C_T \in [-1.2\%, 1.0\%]$<br>$\Delta C_F \in [-0.5\%, 3.0\%]$<br><br>In such case the APM randomization scheme would consist of 4 continuous stochastic parameters. |
| | $\delta_{APM}$ | Vector of values given the RE to the stochastic parameters associated with the APM for the current trajectory computation run |
| 12 | IC randomization metadata | Data structure containing the information related to the randomization of the initial conditions, i.e. the parameters encompassed by vector $\delta_{IC}$, along with their corresponding ranges:<br><br>[E7] $\delta_{IC} \in [\delta_{IC,1}, \delta_{IC,2}]$<br><br>E.g.: A simple way to randomize the initial conditions could be by distorting their value by a random % amount, known to lie within certain limits (observation errors), i.e.:<br><br>[E8] $\delta_{IC} = \begin{bmatrix} \Delta u_0 \\ \Delta X_0 \\ \Delta \dot{X}_0 \end{bmatrix}$    $\Delta u_0 \in [u_0^1, u_0^2]\%$<br>$\Delta X_0 \in [X_0^1, X_0^2]\%$<br>$\Delta \dot{X}_0 \in [\dot{X}_0^1, \dot{X}_0^2]\%$<br><br>In such case the IC randomization scheme would consist of 15 continuous stochastic parameters. |
| | $\delta_{IC}$ | Vector of values given the RE to the stochastic parameters associated with the initial conditions for the current trajectory computation run |

FIG. 30b

| Interface | Information item exchanged | Description |
|---|---|---|
| 3 | (X,t) | TE request for atmospheric aspects at given location and time |
| | Atmospheric scenario | AM response with environmental aspects at requested location and time. The data structure includes all the elements in Figure 17. The atmospheric conditions are taken from the currently active atmosphere scenario. |
| 4 | X | APM request for atmospheric aspects at given location |
| | Atmospheric scenario | AM response with environmental aspects required by the APM. The atmospheric conditions are taken from the currently active atmosphere scenario. |
| 6 | (X,u) | TE request for aircraft performance aspects associated with given AV state |
| | Aircraft performance aspects | APM response with aircraft performance aspects requested. The data structure includes all the elements in Figure 16. |

FIG. 31

| Interface | Information item exchanged | Description |
|---|---|---|
| 2 | 4D AM domain | Explained in Figures 29a and 29b. |
| | PAM metadata | Data structure containing the information related to how probabilistic atmospheric forecast data is structured and provided to the PAM. Essentially, such information describes:<br>- Time reference (e.g. UTC+k or GPS time)<br>- Number of members of the AM *ensemble* (AM *scenarios*): q (typically q<30)<br>- An AM scenario $W_i$ is composed by 5 *4D cubes* that correspond to the atmospheric characteristics of interest to TP: pressure, temperature and the 3 components of wind over the 4D domain selected<br>- Each 4D cube is composed by a number $n_t$ of *3D cubes* timely equispaced an amount $\Delta t$ (typically $\Delta t$=10 min)<br>- Each 3D cube is composed by a number $n_h$ of *layers* equispaced in altitude an amount $\Delta h$ (typically $n_h$~30)<br>- Each layer has the structure of a 2D grid of $n_\lambda \times n_\varphi$ values of the corresponding atmospheric characteristic, equispaced respectively $\Delta\lambda$ and $\Delta\varphi$ (typically $n_\lambda$~$n_\varphi$~100)<br>- The values provided are dimensionless and scaled by the corresponding factors to reduce data size. Additional compression mechanisms might be used. The PAM metadata information shall contain the parameters needed to undo the non-dimensionalization, scaling and compression to retrieve the desired atmospheric aspects, p, T and w<br>- The atmospheric forecast provided by each scenario is valid for a time span of $\Delta t_v = n_t \Delta t$ (typically 2.5 hours), whereas the P-DMET produces a refresh of the scenario every $\Delta t_r$ (typically 1hour), which is the *scenario refresh rate*. This allows a time interval of $\Delta t_v - \Delta t_r$ for the PAM to retrieve the scenario update, once it becomes ready.<br>- The initial time $t_{0,i}$ for i=1,...,q} are offset an amount to time $\Delta t_o = \Delta t_r / q$ to spread as much as much as possible the interactions over time between the P-DMET and the PAM, thereby avoiding bandwidth usage picks.<br>- Possibly, other information regarding QoS aspects, message segmentation metadata, catalog/feedback about availability of 4D domains, notifications, subscription/authentication, etc |
| | Atmospheric forecast ensemble | Sequence of data structures containing the actual atmospheric forecast data as described by the PAM metadata, which is received by the PAM and assembled to enable the functionality required by the TC |

SYSTEM AND METHOD FOR DEFINING AND PREDICTING AIRCRAFT TRAJECTORIES

CROSS-REFERENCE TO RELATED APPLICATIONS

This Application is a 35 USC §371 U.S. National Stage filing of International Application No. PCT/IB2014/066292 filed Nov. 24, 2014, and claims priority under the Paris Convention to European Patent Application No. 13382579.4 filed on Dec. 31, 2013.

FIELD OF THE INVENTION

The present invention, as expressed in the title of this specification, relates to a method and associated system for defining and predicting most suitable aircraft trajectories during a flight, each of said aircraft trajectories most suitably accomplishing a predetermined figure of merit previously established by a flight manager either located on board or outside the aircraft, said flight manager being either a person or a machine.

It is especially applicable in the electronics and avionics industry, and in the field of Air Traffic Management.

BACKGROUND OF THE INVENTION

Aircraft trajectory definition is an important task that flight managers have to face in order to reach some scheduled goals related to certain figures of merit (FOM'S).

When establishing which aircraft trajectory is to be considered the best one for a flight between two geographic positions, there is no unique criterion for defining what is "the best trajectory", therefore existing different criteria, according to which, different aircraft trajectories might be simultaneously considered "the best one", it depending on which goal is to be considered the main target to be accomplished by a certain flight.

These goals, also called "Figures of Merit" (FOM's), are defined in terms of cost saving, time saving, distance saving, or any task that a flight manager might establish.

Therefore, it appears obvious that an aircraft trajectory which might be considered the best one in terms of time saving for a flight between two geographical positions, might not be the best one in terms of cost saving, and vice versa.

The problem of choosing the most suitable trajectory according to the FOM to be optimized increases its complexity when taking into account the weather conditions in the different segments of the flight trajectory in which the aircraft is to be flying.

Weather conditions can substantially affect the performance of the aircraft during the flight and the achievement of the proposed goals, so it is extremely convenient, when not even compulsory, to avoid the areas in which storms or strong winds are forecasted, or at least being able to determine in what extent do these meteorological aspects affect the achievement of certain FOM's in certain trajectories.

With these regards, flight managers currently take into account weather conditions in a deterministic manner, i.e. they analyze a unique forecast which is considered valid for a large region and for a long period of time, therefore not profiting from the current available numeric model forecasts, which contemplate different possible forecasts, assigning to each of said forecasts a certain probability.

The uncertainty associated with the weather forecast is considered to be the biggest source of uncertainty influencing the definition and prediction of the aircraft trajectory during a flight.

That is, if we are looking forward to know which trajectory might be the best one in terms of cost saving (the cheapest one), and we do not consider several weather scenarios, then, the uncertainty in a chosen trajectory being indeed the cheapest one is big.

Therefore, there is a current concern in flight management in managing many uncertainty sources so as to reduce their associated uncertainty, avoiding uncertainty spread into predicted trajectories.

DESCRIPTION OF THE INVENTION

The present disclosure addresses the mentioned problem by utilizing a novel description language (namely Aircraft Intent Description Language, AIDL) for accurately defining all the parameters concerned with trajectory definition and prediction, therefore suppressing one source of uncertainty in trajectory description, which is the uncertainty associated with trajectory definition. This language is already defined in patent document WO/2009/042405.

The present disclosure relates to a method that, using the mentioned description language, determines all the parameters which are to be taken into account for defining and predicting aircraft trajectory, and creates a set of stochastic variables from each of the determined parameters, subsequently calculating a trajectory for the aircraft which best meets a given Figure of Merit (FOM), from each set of stochastic variables.

The parameters described by the description language (AIDL) from where a set of stochastic variables is to be created comprise, among others: weather parameters and aircraft performance parameters.

By implementing the method of the present disclosure, a set of possible trajectories, each one considering a different scenario, with an associated uncertainty, is defined. Therefore, the uncertainty associated to each of the calculated trajectory is accurately determined (i.e. the uncertainty with which each calculated trajectory meets a certain FOM), while a robust trajectory which best meets a given FOM is ensured.

The method described in the present patent application is useful for helping the flight manager to decide which trajectory is the most appropriate given certain meteorological and aircraft conditions. The method of the present disclosure is to be implemented with a decision support tool (DST) which shall help a flight manager to take decisions. In some cases (i.e. when considering UAV's), it is the DST itself which takes the decision of which of the calculated trajectories to choose.

The present disclosure also relates to a system comprising all the necessary equipment for implementing the method of the present disclosure.

As introduced, the present disclosure refers to a method for defining and predicting aircraft trajectories, for use in flight management of an aircraft, which comprises:

a. acquiring input data of both aircraft performance characteristics and atmospheric data, and b. defining trajectory parameters to which the aircraft trajectory must be subjected, wherein
   aircraft trajectory parameters are defined by means of a specific Aircraft Intent Description Language, which is constituted by specific signs, wherein each segment of the aircraft trajectory is described by each sign of the Aircraft Intent Description Language, wherein each specific combination of signs of the Aircraft Intent Description Language completely describes a whole trajectory;

atmospheric data is acquired in the form of a plurality of atmospheric forecast ensembles, each atmospheric forecast within an atmospheric forecast ensemble expressing a determined weather scenario with an associated probability;

wherein the method further comprises:

c. calculating a predicted trajectory from each atmospheric forecast of an atmospheric forecast ensemble, said predicted trajectory having associated information regarding a certain figure of merit of the aircraft trajectory;

wherein an ensemble of predicted trajectories is obtained from each atmospheric forecast ensemble, each predicted trajectory of the ensemble of predicted trajectories having an associated probability derived from the probability of each atmospheric forecast within an atmospheric forecast ensemble, and;

d. utilizing a selected predicted trajectory in flight management of an aircraft in at least one segment of a flight.

The method described in the present disclosure further comprises:

a. selecting a specific figure of merit of each aircraft predicted trajectory;

b. determining, for each predicted trajectory within an ensemble of predicted trajectories, the value of the selected figure of merit;

c. calculating, according to a predetermined statistical criterion, a statistical value of the selected figure of merit, said calculated statistical value representing, according to the selected figure of merit, all the predicted trajectories within each ensemble of predicted trajectories;

d. determining the predicted trajectory, from each ensemble of predicted trajectories, whose value for the selected figure of merit, is closer to the previously calculated statistical value of the selected figure of merit;

e. calculating, according to a predetermined statistical criterion, the dispersion of values for the selected figure of merit, with respect to the calculated statistical value of the selected figure of merit for all the predicted trajectories of each ensemble of predicted trajectories.

Furthermore, the method for defining and predicting aircraft trajectories comprises selecting a predicted trajectory, from among the calculated predicted trajectories, said selected predicted trajectory best meeting predetermined trajectory selection criteria.

In a preferred embodiment, each of said specific signs of the Aircraft Intent Description Language is made up by the combination of at least three trajectory restrictions and four configuration instructions, wherein all the degrees of freedom of the aircraft trajectory are coped by imposing the three trajectory restrictions, thus the aircraft trajectory being completely defined by imposing the three trajectory restrictions, these restrictions selected from among at least the following:

longitude;
latitude;
altitude;
true airspeed;
bearing;
throttle;
path angle;
bank angle;
high lift;
speed brakes.

In turn, each figure of merit is preferably selected from at least:

fuel burnt;
arrival time at given fix;
cost index;
Range of horizontal distance covered;
2D position at given time;
2D position at a given fix;
2D position over a trajectory segment;
altitude at given time;
altitude at a given fix;
altitude over a trajectory segment;
3D position at given time;
3D position at a given fix;
3D position over over a trajectory segment;
4D position at given time;
4D position at a given fix;
4D position over a trajectory segment;
speed at given fix;
speed over a trajectory segment;
attitude at given fix;
attitude over a trajectory segment;
wake vortex at given time;
wake vortex at a given fix;

The present disclosure also refers to a system for defining and predicting aircraft trajectories, for use in flight management of an aircraft, wherein the system comprises:

a. a processor unit, for calculating predicted trajectories for each segment of an aircraft flight utilizing a specific Aircraft Intent Description Language, each calculated predicted trajectory being calculated based on stochastic input data, therefore each calculated predicted trajectory being stochastic and having an associated probability, the input data selected from at least the following:

Aircraft Performance Model parameters;
atmospheric forecasts;

b. a probabilistic Digital Meteorological Service unit, being configured to provide the processor unit for calculating predicted trajectories with the input of an ensemble of atmospheric forecasts;

c. a robust Decision Support Tool unit, being configured for:

providing the processor unit for calculating predicted trajectories with input data necessary for predicting trajectories, and;

selecting a predicted trajectory from among the predicted trajectories calculated by the processor unit for calculating predicted trajectories;

wherein the selected predicted trajectory is utilized by a flight management system in guidance of an aircraft in at least one segment of a flight.

In a preferred embodiment, the probabilistic digital meteorological service unit defines:

a. an atmospheric model domain including one or more parameters that define a region enclosing the volume of airspace in which the flight trajectory lies;

b. an atmospheric model providing multiple atmospheric scenarios of atmospheric parameters relevant to the airspace, said scenarios forming ensembles of atmospheric forecasts.

Furthermore, in a preferred embodiment, the robust decision support tool unit defines:

a. a predetermined flight trajectory including one or more parameters which define the flight trajectory, by means of imposing a combination of three trajectory restriction parameters for each segment of the flight trajectory;
b. an aircraft performance model including one or more parameters which define aircraft response upon external conditions;
c. parameters related to aircraft initial conditions at beginning of a segment of the flight trajectory;
d. a set of parameters defining at least one figure of merit of a predicted trajectory calculated by the processor unit for calculating predicted trajectories;
e. at least one criterion to choose a predicted trajectory from among at least one ensemble of predicted trajectories calculated by the processor unit for calculating predicted trajectories, this at least one criterion based on searching which predicted trajectory best represents a central statistical value of a certain figure of merit;
f. at least one criterion for the calculation of an associated uncertainty with which a chosen predicted trajectory represents a central statistical value of a certain figure of merit.

The processor unit for calculating predicted trajectories:
determines a set of parameters from among the input parameters provided by the robust decision support tool unit, which are considered stochastic, thus these set of parameters being subjected to uncertainty;
determines type and range of uncertainty of the stochastic set of parameters.

The processor unit for calculating predicted trajectories:
a. determines, based on parameters for the atmospheric model, aircraft performance model, flight trajectory description, and initial conditions, a data set representing a predicted trajectory;
b. assigns values, with respective ranges of uncertainty, to the parameters to be made stochastic, to create a plurality of possible instances of the data set representing the predicted trajectory;
c. calculates, based on the ensemble of atmospheric forecasts, an ensemble of predicted trajectories, each calculated predicted trajectory based on a corresponding atmosphere scenario;
d. assesses at least one figure of merit of each predicted trajectory within an ensemble of predicted trajectories, to obtain a population of values of these figures of merit;
e. identifies, according to a certain statistical criterion, a predicted trajectory within each ensemble of predicted trajectories, that represents a central value of the at least one figure of merit assessed;
f. obtains, according to a certain statistical criterion, a dispersion of the values of the at least one figure of merit assessed, associated with the remaining trajectories of the ensemble of predicted trajectories, with regard to the predicted trajectory identified in the previous phase.

The processor unit for calculating predicted trajectories preferably comprises at least:
a. a randomization engine unit, for assigning values to the parameters to be made stochastic, received from the probabilistic digital meteorological service unit and the robust decision support tool unit;
b. a trajectory computation unit, for calculating predicted trajectories based upon input data provided by the randomization engine unit.

Said input data is preferably selected from at least the following:
Aircraft Performance Model parameters;
Trajectory description parameters;
predetermined figures of merit;
trajectory selection criteria;
atmospheric forecasts.

The robust decision support tool unit is configured to provide the processor unit for calculating predicted trajectories with input of:
aircraft Performance Model parameters;
trajectory description parameters;
selected Figures of Merit, and;
trajectory selection criteria.

BRIEF DESCRIPTION OF THE FIGURES

FIG. 15: table showing variables involved in the formulation of AV's motion problem.
FIG. 16: table showing formulation of the forces (actions) that drive AV's motion.
FIG. 17: table showing formulation of the environmental aspects involved in the AV's motion.
FIG. 18: table showing trajectory aspects considered in AIDL-based TP.
FIG. 19: table showing positions involved in TP error definitions.
FIG. 20: table showing 4D TP errors.
FIG. 21: table showing TP errors in attitude, speed and mass.
FIG. 22: table showing AM errors in pressure, temperature and wind.
FIG. 23: table showing trajectory-related applications, functions and aspects.
FIGS. 24a, 24b: tables showing a survey of FOM's of current/potential interest to representative trajectory-based DST's.
FIG. 25: table showing representative FOM's that describe merit at the end point of a single trajectory.

FIG. 26: table showing typical trajectory selection criteria to derive a central measure of FOM populations.

FIG. 27: table showing typical statistical measures of FOM dispersion.

FIG. 28: table showing representative FOM's that describe merit of the whole trajectory.

FIGS. 29a, 29b: tables showing interactions between the r-DST and the s-TP.

FIGS. 30a, 30b: tables showing interactions between the RE and the underlying TC infrastructure.

FIG. 31: table showing interactions between the internal components of the TC infrastructure.

FIG. 32: table showing interactions between the P-DMET and the TC infrastructure.

DESCRIPTION OF AN EXEMPLARY EMBODIMENT

Figure 1:
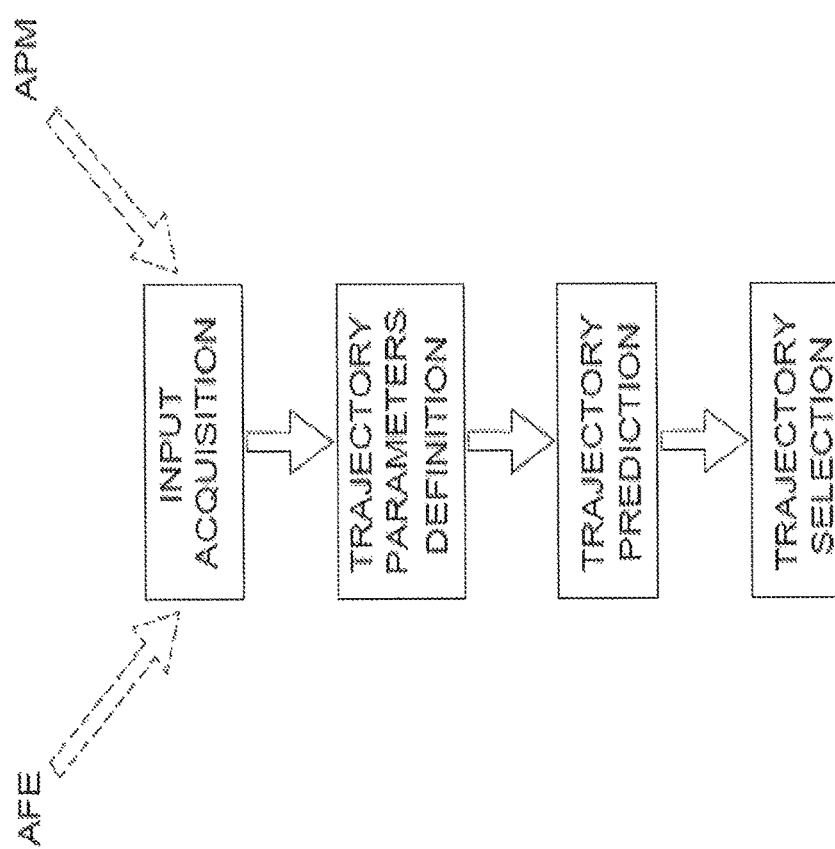
FIG. 1: shows a flow chart describing all the different phases comprised within the method of the disclosure.

The following is a description of an embodiment of the invention making reference to the figures. FIG. 1 shows a flow chart describing the different phases comprised within the method of the disclosure.

According to one aspect of the present disclosure, an exemplary embodiment of a method is disclosed for defining and predicting aircraft trajectories, for use in flight management of an aircraft. The method comprises acquiring input data of both aircraft performance characteristics (Aircraft Performance Model, APM) and atmospheric data (Atmospheric Forecast Ensemble, AFE), and defining trajectory parameters to which the aircraft trajectory must be subjected. The method comprises defining aircraft trajectory parameters by means of a specific Aircraft Intent Description Language (AIDL), which is constituted by specific signs, wherein each segment of the aircraft trajectory is described by each sign of the Aircraft Intent Description Language (AIDL), wherein each specific combination of signs of the Aircraft Intent Description Language completely describes a whole trajectory.

The method comprises acquiring a plurality of atmospheric forecast ensembles (AFE's), each atmospheric forecast within an atmospheric forecast ensemble (AFE) expressing a determined weather scenario with an associated probability.

The method comprises calculating a predicted trajectory from each atmospheric forecast of an atmospheric forecast ensemble (AFE). The predicted trajectory has associated information regarding a certain figure of merit (FOM) of the aircraft trajectory, wherein an ensemble of predicted trajectories is obtained from each atmospheric forecast ensemble (AFE). Each predicted trajectory of the ensemble of predicted trajectories has an associated probability derived from the probability of each atmospheric forecast within an atmospheric forecast ensemble (AFE). The method further includes utilizing a selected predicted trajectory in flight management of an aircraft in at least one segment of a flight.

According to the method of the present disclosure, an ensemble of meteorological forecasts is produced by a probabilistic Digital Meteorological Service unit (2), p-DMET. Each meteorological forecast depicts a certain possible meteorological scenario, all meteorological forecasts within the ensemble (AFE) having a certain associated probability. In certain cases, all meteorological forecasts within the ensemble (AFE) have the same associated probability.

Then, a set of constraints is established, for each segment of the flight trajectory. These constraints are related to aspects such as height, speed, arrival times or separation between aircrafts.

These constraints being expressed in a novel language, namely Aircraft Intent Description Language (AIDL), according to which there exists a direct relationship between the constraints imposed and the flight trajectory to be followed by the aircraft in each particular segment of the trajectory.

The AIDL code establishes that each possible combination of three different constraints, with their associated values, along with four motion configuration parameters, constitute a particular alphabet symbol that unambiguously defines a particular segment of the aircraft trajectory. Combining every symbol during a flight, a totally defined aircraft trajectory is obtained for every single segment of the aircraft trajectory.

Thus, profiting from this novel approach, the uncertainty associated to trajectory prediction which is caused by the uncertainty associated to trajectory definition is cancelled.

However, it still remains the uncertainty associated to trajectory prediction (TP) which is caused by the uncertainty associated to both Aircraft Performance Model (APM) and Meteorological Forecast. Nevertheless, the uncertainty associated with the authenticity of the Aircraft Performance Model (APM) is to be neglected when compared to the uncertainty associated to Meteorological Forecast.

Therefore, the main technical solution that the present disclosure solves is that of reducing the uncertainty associated to trajectory prediction (TP) which is caused by the uncertainty associated with the meteorological forecast used to predict said trajectory.

Accordingly, instead of using one unique meteorological forecast, an ensemble of possible meteorological forecasts (AFE) is obtained, each forecast depicting a different plausible meteorological scenario which, along with the set of constraints, is used to calculate the predicted trajectory.

The predicted trajectory, which unambiguously attains to the constraints established, is calculated by means of a set of equations that express the relationship between every single aspect concerned in the trajectory.

To this point, the novelty consists in unambiguously defining the trajectory by means of a predetermined set of constraints for each segment of the flight, and utilizing an Atmospheric Forecast Ensemble (AFE) to calculate the predicted trajectories.

Therefore, each predicted trajectory segment is calculated, straightly in terms of a given set of constraints (which obviates the need of directly ordering aircraft maneuvers, which are implicitly defined by the imposed combination of constraints). Additionally, a set of stochastic predicted trajectories is obtained, each one resulting from calculating a predicted trajectory from a particular meteorological scenario, obtained from the Atmospheric Forecast Ensemble (AFE).

To this point, a set of predicted trajectories is obtained. Every segment of a predicted trajectory is defined in terms of a state vector, which defines the space position of the aircraft in every single moment, by means of space coordinates, $X(t)$, $Y(t)$, $Z(t)$, the state vector also defining some aspects related to at least fuel consumption, arrival time or separation with respect to other aircrafts in its proximity.

All these aspects are also called Figures of Merit (FOM's), which a flight manager might be interested in optimizing for each particular case.

Then, a preferred FOM to be optimized is selected, and the predicted trajectories are re-ordered in terms of a certain statistical criterion referred to that FOM.

For example, predicted trajectories may be re-ordered to show which one best represents (is closest to) the statistical mean of the fuel consumption, and then a measure of the dispersion for the fuel consumption (or for any other particular FOM) related to the selected predicted trajectory is obtained, said measure of dispersion obtained from the FOM population that corresponds to the trajectory sample space (i.e. the given ensemble of trajectories). The measures of FOM dispersion are selected from at least: STD, MAE, SEE, RMS.

Thus, the present disclosure provides a general methodology to find out a Robust Predicted Trajectory (RPT) and the associated population of FOM values (or other statistics of interest), given a certain definition of the FOM.

The present disclosure, as it has already been expressed, also refers to a system according to the mentioned method, the system providing for the necessary equipment to carry out the described method.

The system comprises a probabilistic digital meteorological service unit (2), p-DMET, which creates the atmospheric forecast ensembles (AFE's), and gives such AFE's as an input (codified in AIDL language) for a main processor unit (1) comprised within the system of the present disclosure, which is the processor unit (1) for calculating predicted trajectories, namely stochastic trajectory prediction unit (s-TP).

In a preferred embodiment, the system also comprises a robust decision support tool unit (3), r-DST, which provides the trajectory prediction processor unit (1), s-TP, with at least three main inputs (codified in AIDL language), respectively referred to the trajectory definition, the FOM of interest to be searched, and the statistical criterion upon which the information regarding the FOM of interest and its associated uncertainty are to be presented.

Figure 2:
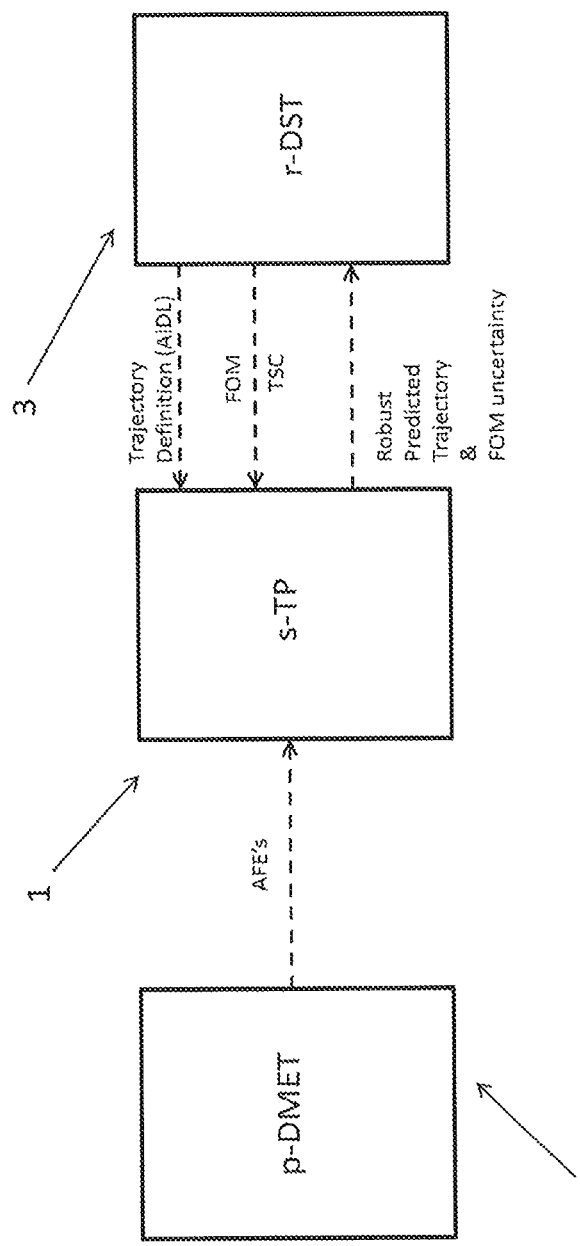
FIG. 2: shows a simplified block diagram depicting the main elements of the system of the present disclosure.

FIG. 2 shows a simplified block diagram depicting the main elements of the system of the present disclosure.

Figure 3:
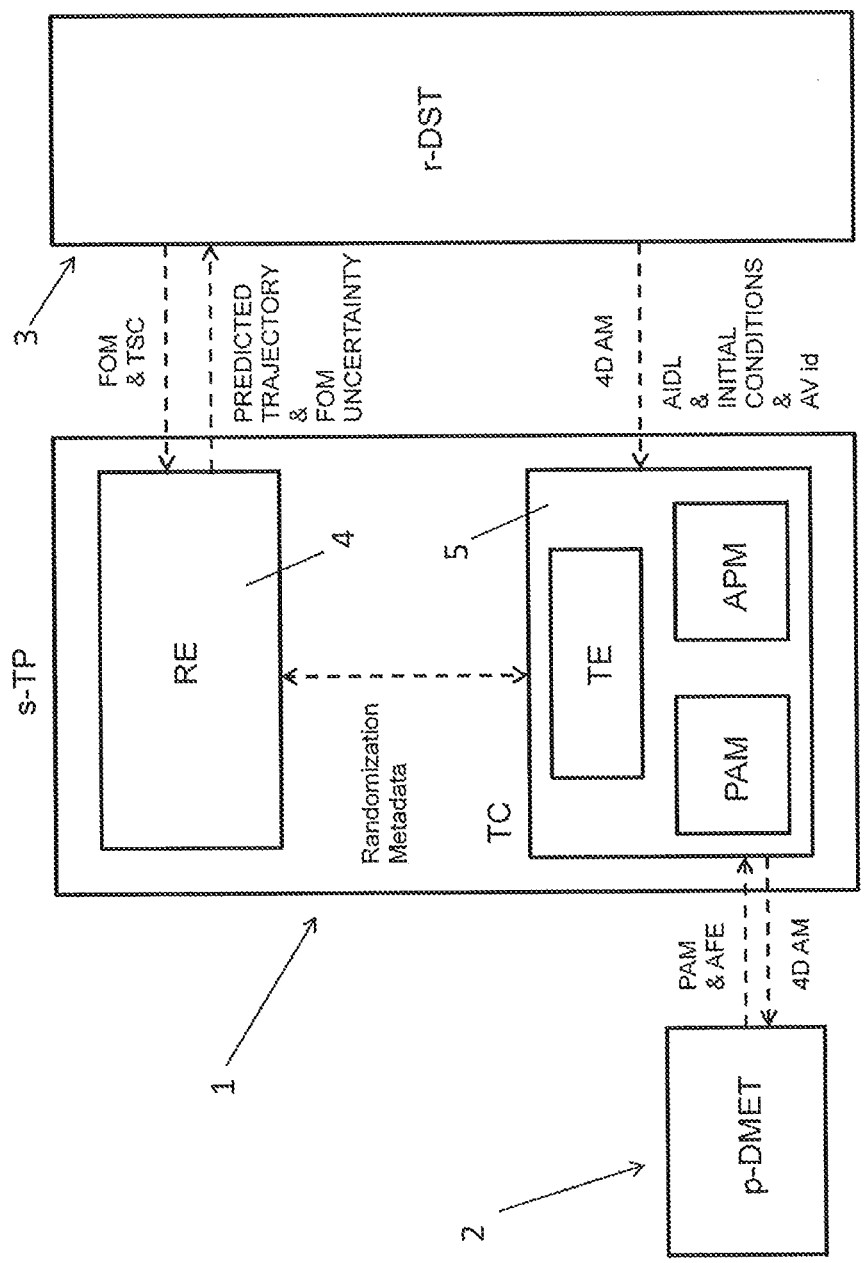
FIG. 3: shows a more detailed block diagram, focusing on the main elements constituting the stochastic trajectory prediction unit (s-TP) shown in FIG. 2.

FIG. 3, in turn, shows a more detailed block diagram, focusing on the main elements constituting the stochastic trajectory prediction processor unit (1), s-TP, and the way the input information provided by the probabilistic digital meteorological service unit (2), p-DMET, and the robust decision support tool unit (3), r-DST, is treated therein.

The stochastic trajectory prediction processor unit (1), s-TP, bases its analysis, according to the method of the present disclosure, in Monte Carlo simulation, through which s-TP is enabled to produce a set of stochastic trajectories and statistically treat it. To that end, the processor unit (1), s-TP, is made up by two main components:

Randomization Engine, RE, Unit (4): This component coordinates the process that produces the set of resulting stochastic trajectories. The RE prepares the stochastic input data in each trajectory computation (TC) run, according to certain predefined uncertainty parameters (6), and sends those input to a trajectory computation unit (5), TC, for their computation. Furthermore, it is in charge of handling the set of outputs in order to obtain the robust predicted trajectory and the uncertainty of its associated figure of merit (FOM).

Trajectory Computation, TC, Unit (5): The trajectory computation unit (5), TC, is a component that computes, in a deterministic manner, one trajectory for each set of input data provided by the randomization engine unit (4), RE, in each run. The trajectory computation unit (5), TC, is made up by the following components:

i) a Trajectory Engine (TE), which formulates and integrates the set of equations describing the AV (air vehicle) motion during an interval of interest (4D Aircraft Model Domain, as will be explained below in more detail) taking as input the AIDL script (trajectory definition in AIDL code) and Initial Conditions;
ii) an Aircraft Performance Model (APM), which provides the performance data of any particular type of aircraft (AV id) to the trajectory engine (TE);
iii) a Probabilistic Atmosphere Model (PAM), which replaces the deterministic atmosphere scenario, normally used in conventional trajectory prediction, TP, approaches, by the possibility of selecting different atmospheric scenarios out of a set (or ensemble) of possible scenarios, provided by the probabilistic digital meteorological service unit (2), p-DMET.

The following is an overall approach to the aspects involved in the present disclosure:

As already introduced, it is essential to understand how the uncertainty associated to the data feeding the trajectory prediction processor unit (1), s-TP, propagates into uncertainties in specific aspects of interest of the predicted trajectories. Thus, the present disclosure provides an improvement in efficiency and robustness of Trajectory Prediction, achieved by explicitly considering stochastic rather than deterministic trajectory predictions to support decision making in different contexts.

First of all, it is considered paramount to understand the whole life-cycle of an aircraft trajectory and how the different pieces of trajectory information and uncertainties present at each stage of the trajectory prediction process combine together to bring about the final (actual) trajectory of each aerial vehicle and the performance of the overall traffic solution.

Figure 4:
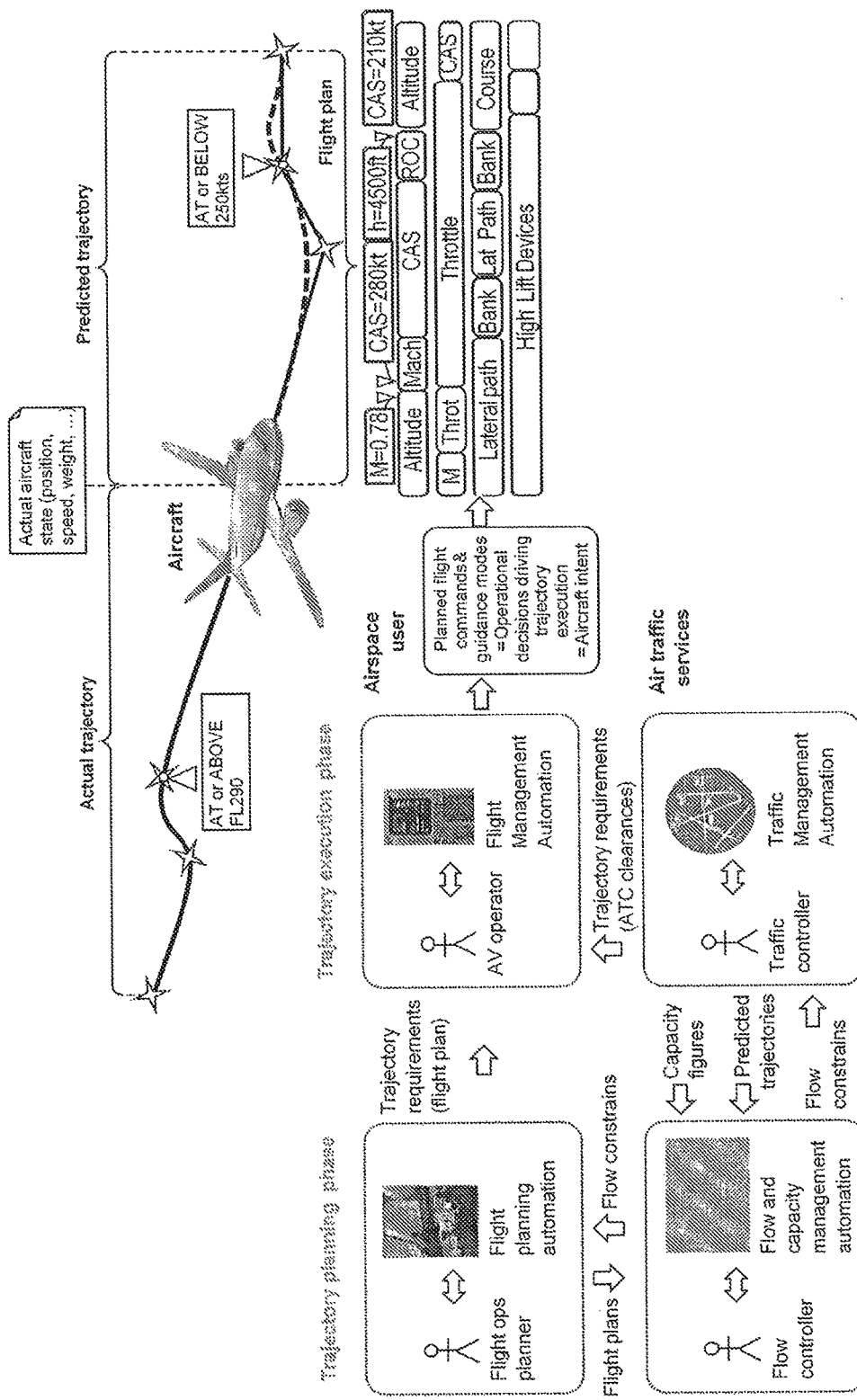
FIG. 4: shows distributed human-machine interactions and notions of trajectory involved in the trajectory life-cycle.

FIG. 4 illustrates the complex interactions that take place among automation (Decision Support Tools, DST's) and humans at different places and timeframes before the specific decision on how to operate a given aircraft is established. Such interactions involve more or less detailed collections of trajectory requirements that are produced, exchanged and refined among the actors involved in a collaborative decision making process called trajectory negotiation, whose ultimate outcome is the actual trajectory flown by each aircraft participating in a certain traffic. The three major stages of the aircraft trajectory life cycle are:

1) Trajectory requirements: the notion of flight plan and its possibly different representations (e.g. sequence of route segments, waypoints, estimated times of arrival—ETA's—) plus the tactical amendments enforced by Air Traffic Control (ATC) during the execution of the flight (e.g. speed or time constrains, altitude constraints and lateral path deviations), which are collectively referred to as "Flight Intent".
2) Aircraft operational decisions: the specific recipe that the flight management automation or the pilot or the combination of both apply to govern the operation of the aircraft, known as "Aircraft Intent".
3) Results: the actual trajectory exhibited by the aircraft as a result of such specific way of operation (typically represented as a time-sorted sequence of positions and possibly additional information such as speed and instantaneous mass).

The support provided by the corresponding decision support tools, DST's, to the human operators involved in the process is generally based on specific aspects or merits of the trajectories, such as position, time or fuel consumption, which are anticipated by means of a sort of trajectory prediction, TP. Thus, the goodness of the decisions made to organize the traffic solution and, therefore, the resulting performance at both individual (single flight) and aggregate (traffic) levels is directly linked to the performance of the trajectory prediction process, TP, underlying each DST function.

Figure 5:
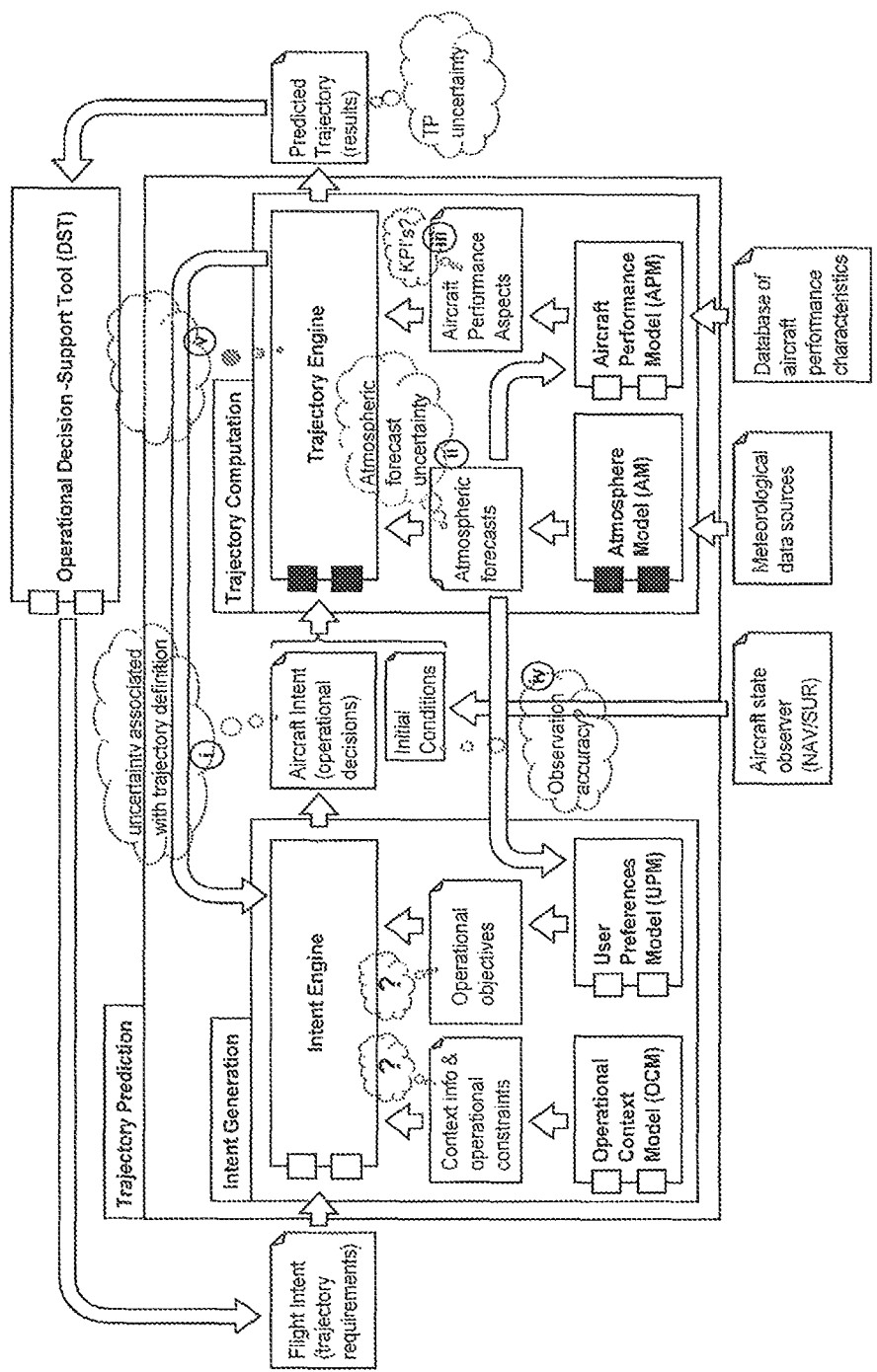
FIG. 5: shows main elements and uncertainties involved in the TP process supporting the operation of a DST.

FIG. 5 illustrates a generic trajectory prediction process, TP. In general terms, a digital support tool, DST, iterates with its underlying TP infrastructure by trying a set of trajectory requirements and refining it until the resulting predicted trajectory meets the operational goals set by the digital support tool, DST.

A trivial instance of such idea is the case of a Conflict Detector (DST=CD), which, given the knowledge available about a given set of trajectories (Flight Intents), obtains the corresponding predicted trajectories to cross check positions and times among them to identify potential losses of separation. A more sophisticated case is the case of a Flight Planner (DST=FP), which might iterate (eventually several times) with its TP infrastructure to find out a business trajectory that meets given ATC/ATFCM (Air Traffic Flow and Capacity Management) constraints while the remaining degrees of freedom (DOF's) left are taken advantage of to optimize fuel consumption or time or a compromise of both (e.g. cost-index).

In general, the TP process encompasses two major internal sub-processes: Intent Generation and Trajectory Computation. The intent generation deals with the transition from the given trajectory requirements to the next stage of the trajectory life-cycle, i.e. the formulation of a specific way of operating the aircraft (Aircraft Intent), intended to result in a trajectory that meets these requirements.

This typically entails an optimization process performed by the so-called Intent Engine, which accounts for additional constraints that any trajectory is required to meet in the given operational context (e.g. Terminal Management Area—TMA—, minimum altitude or max. speed, non-flight zones) as well as for objectives/constraints that pursue specific user preferences (e.g. cost-index, max accelerations) whenever degrees of freedom (DOF's) are available.

The intent generation generally involves an inner iteration loop with the trajectory computation process to find out the "best" aircraft intent, i.e. the one that fulfills all the constraints while achieving the best merit under the applicable objectives. The trajectory computation, on the other hand, is in charge of computing the motion of the aircraft with associated performance characteristics (aerodynamics, propulsive, operational limitations, configuration, etc) executing the given aircraft intent in presence of a certain atmospheric scenario (essentially wind, temperature and pressure), which also directly affects the characteristic performance of the aircraft response.

To that end, a trajectory engine, TE, that embodies a physical model of the flight process solves the corresponding formulation of the equations of motion based on the predicted aspects of aircraft performance and atmospheric conditions respectively provided by the underlying aircraft performance model (APM) and atmosphere model (AM). The transition from aircraft intent to the predicted trajectory usually requires a numerical integration process, which relies on some knowledge about the state of the aircraft at the initial time (initial conditions).

FIG. 5 also depicts the sources of uncertainty in trajectory prediction, which, essentially relate to the level of fidelity and accuracy associated with the information elements involved throughout the TP process described. Of special interest to the embodiments described herein are the sources of uncertainty associated with the process of trajectory computation, i.e.:
 i) the uncertainty in the definition of the trajectory to be computed as expressed by the given Aircraft Intent;
 ii) the uncertainty associated to the meteorological forecasts;
 iii) the key performance indicators (KPI's) that characterize the quality of the aircraft performance aspects involved;
 iv) the uncertainty associated to the observation of the initial conditions, and;
 v) the fidelity of the motion model used by the trajectory engine (TE) to compute the trajectories.

Figure 6:
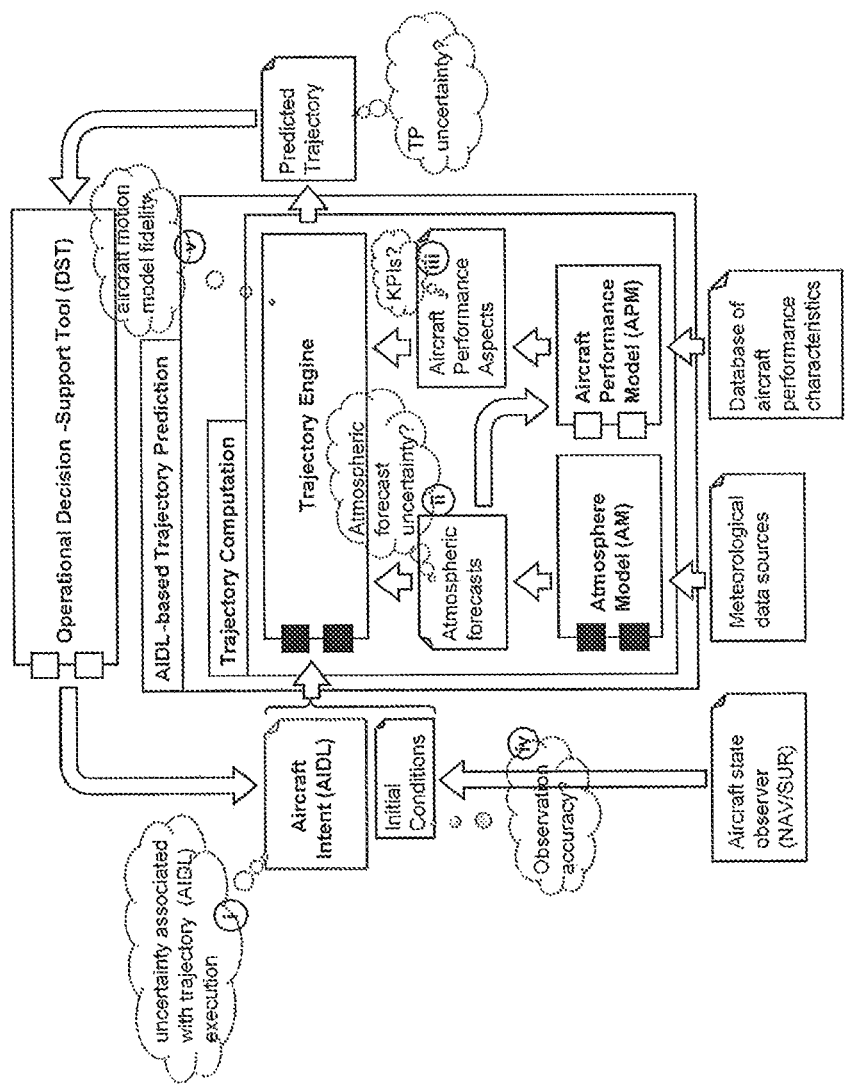
FIG. 6: shows operation of a DST supported by AIDL-based trajectory prediction.
Figure 7:
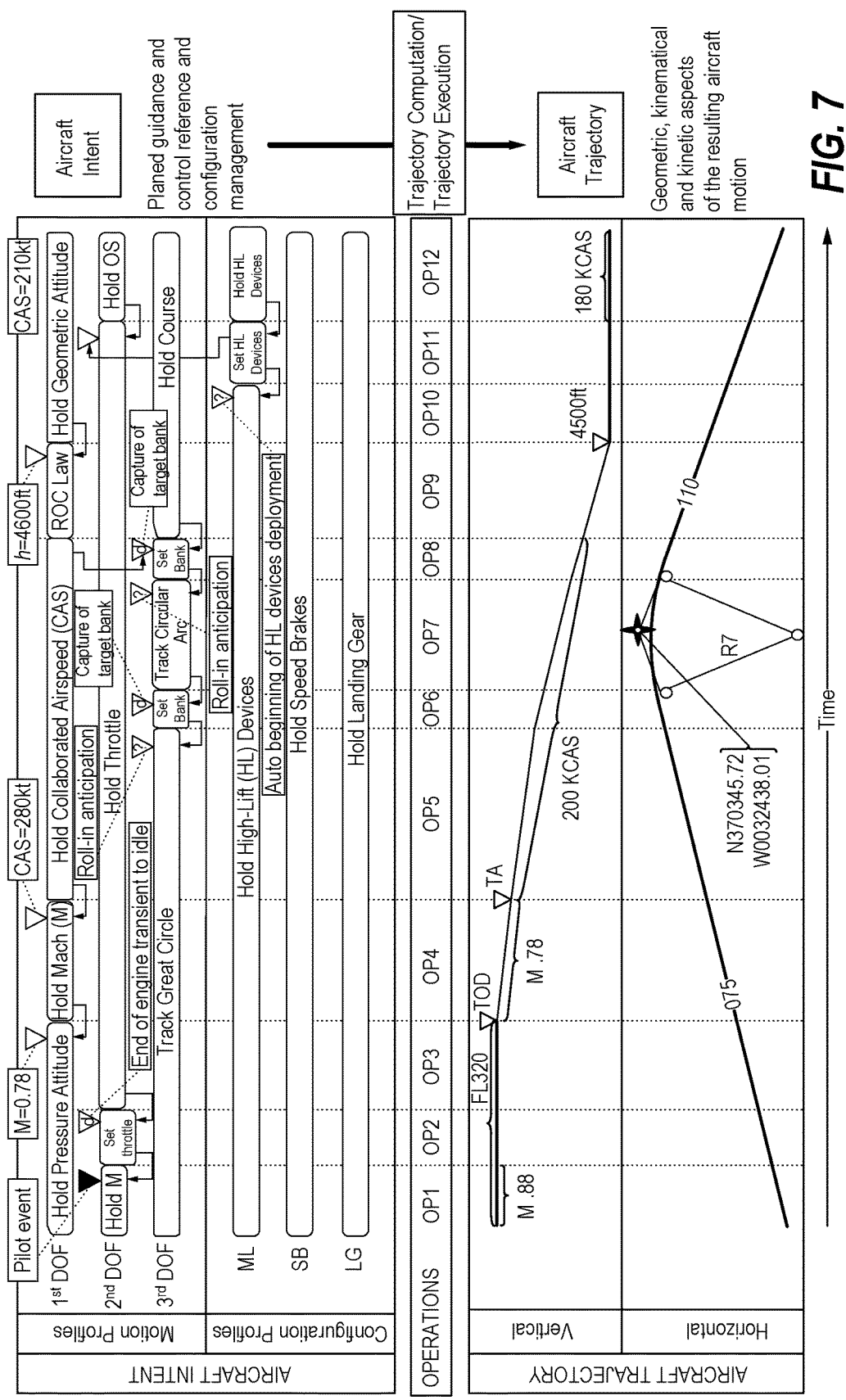
FIG. 7: shows sample trajectory model in terms of AIDL (BR&TE).

The introduction of a trajectory definition method such as the Aircraft Intent Description Language (AIDL), which enables formally describing the Aircraft Intent without ambiguity, makes possible to get rid of a major source of uncertainty, as well as of the complexity associated with the intent generation process. Thus, assuming that the decision support toll (DST) is able to interact with an underlying TP that is AIDL-based, the picture of FIG. 5 turns into the much simpler scheme reflected in FIG. 6, where the uncertainty associated with the aircraft intent is no longer a major trajectory definition uncertainty, but a residual one, associated to the slight differences that can occur when executing in practice the ideal definition of such aircraft intent captured in AIDL (a sample trajectory model in AIDL is shown in FIG. 7).

Following prior-art results, the impact of both Aircraft Performance Model (APM) and aircraft motion model uncertainties in trajectory prediction uncertainty can be neglected in comparison to that caused by the uncertainty in the atmospheric forecasts.

In general, meteorological models are formulated in terms of differential equations that describe the behavior of the atmosphere within certain temporal and spatial domain characterized by, respectively, given, initial and boundary conditions. Such equations correspond to simplifications of the general Navier-Stokes laws that govern fluid dynamics (whose chaotic nature is broadly recognized), which are numerically solved over a discretization of the space and time domains. The chaotic nature of the problem makes its solution extremely sensitive to the following aspects that, therefore, represent the main source of uncertainty in meteorological forecast:
 ii-1) Domain definition: grid shape, cell size, coordinate system, resolution and accuracy of the terrain elevation model, moving surfaces (water) and soil characterization, time horizon and integration time step;
 ii-2) Model and solver: spatial and temporal discretization of the equations that embody physical laws of fluids mechanics and solver method;
 ii-3) Initial/boundary conditions: initial conditions are taken from best current knowledge of the atmospheric status at initial time, whereas boundary conditions are taken at the limits of the spatial domain all along the time interval that span from the initial time till the time for which the solution is required.

Figure 9:
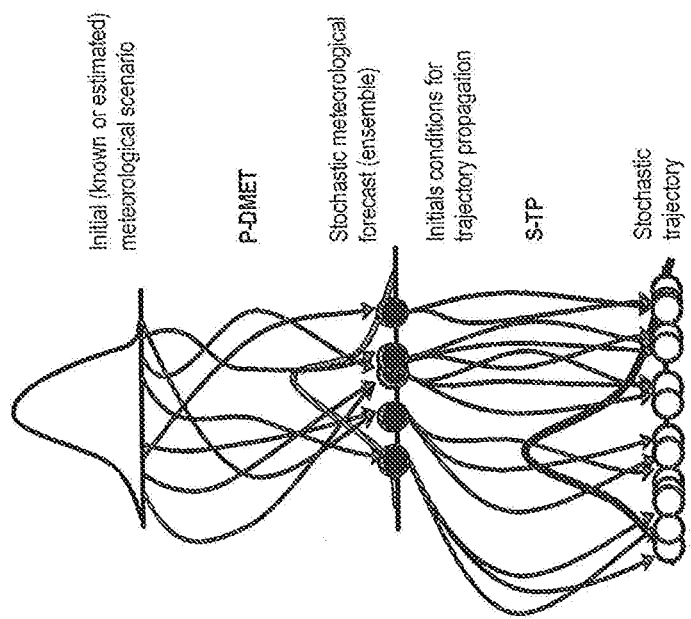
FIG. 9: shows probabilistic expansion of "possible" predicted trajectories based on a meteorological ensemble.

The scheme described produces a deterministic solution. The idea of stochastic forecast introduces the notion of probability in the predictions. The method that is extensively used to provide uncertainty information to the meteorological forecasts is the generation of ensembles. A (meteorological) ensemble is a set of solutions each one obtained through running one or multiple meteorological models based on different input data, i.e. a finite space of probable events, each one representing a possible scenario of atmospheric conditions. Ensembles allow meteorological agencies to provide confidence levels associated with their forecasts. The present method profits from an analogous approach to characterize the uncertainty associated with the forecast of the atmospheric parameters that are relevant to TP (see FIG. 9).

Despite the fact that the sources of uncertainty in trajectory prediction are somewhat known, most of existing decision support tools (DST's) rely on deterministic rather than stochastic trajectory prediction, which implies that prediction uncertainty is marginally considered or absolutely disregarded. Hence, the present method accounts for achieving to trait and exploit TP uncertainty which help DST's to achieve higher operational performance.

Figure 10:
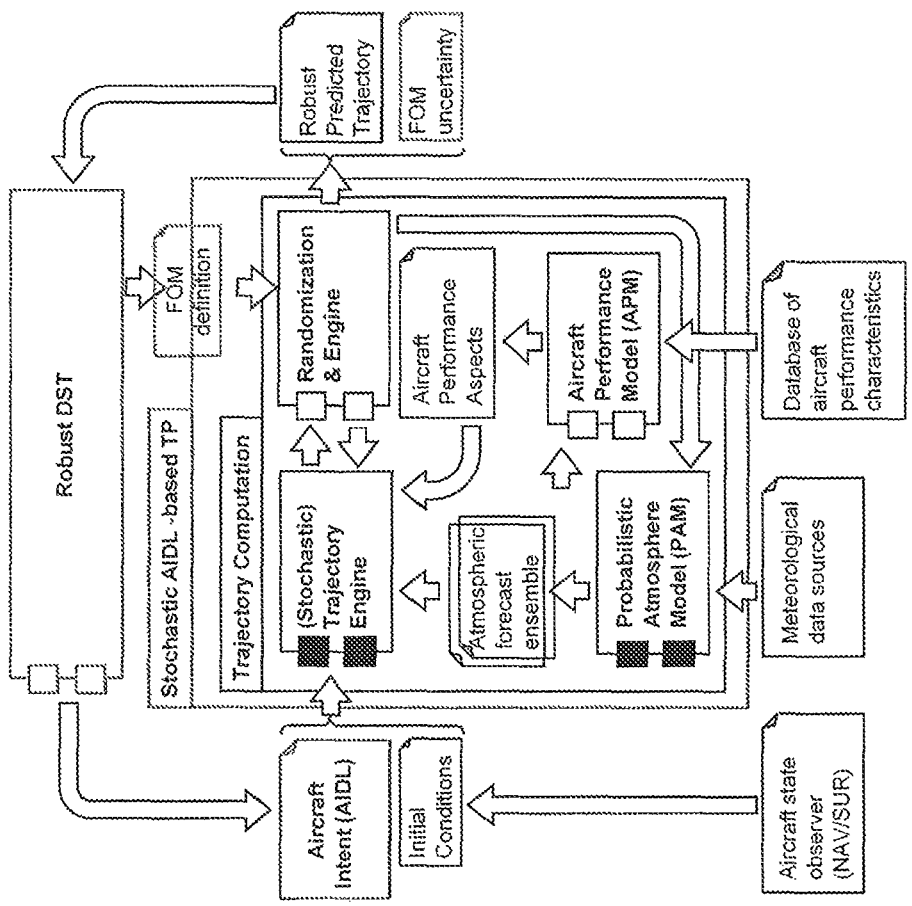
FIG. 10: shows robust operation of a DST supported by an AIDL-based stochastic TP.

Based on the discussion above, the method utilizes the approach outlined in FIG. 10, which extends the TP scheme described so far to cope with the treatment of the uncertainty. The achieved objective is to: a) replace the deterministic atmosphere model by a probabilistic one (PAM, Probabilistic Atmosphere Model) that provides the atmospheric forecast ensembles (AFE's) mentioned, and; b) introduce an additional component denoted as Randomization Engine unit (4), RE, which enables a new interaction with the client DST in terms of uncertainty. In effect, in order to be able to exploit the ability to robustly bounding uncertainty, a "robust" DST unit (3), r-DST, elicits from the underlying stochastic Trajectory Prediction processor unit (1), s-TP, a measure of the uncertainty in a certain aspect or merit of the trajectory, which is of interest for the purpose of the DST business. For instance, an arrival manager (DST=AMAN) might be interested in (robustly) bounding (arrival) time uncertainty, while a flight planner (DST=FP) might be interested in (robustly) bounding a more complex figure of merit (FOM) such as the cost index. For the processor unit (1), s-TP, to produce a (robust) measure of the uncertainty in the figure of merit (FOM) of interest to the decision support tool unit (3), r-DST, the former requires the later to provide a definition of such a figure of merit (FOM).

The first responsibility of the randomization engine unit (4), RE, is to learn what FOM does the decision support tool unit (3), r-DST, hold interest in, and find out the robust predicted trajectory which might not be the most likely to result closer to the actual trajectory in each run, but the one that proves to render the best actual FOM in the long term (i.e. considering the whole probabilistic space).

The second responsibility of the randomization engine unit (4), RE, is to find out the uncertainty in the FOM associated to such robust predicted trajectory. To accomplish its purpose, the randomization engine unit (4), RE, requires a close interaction (possibly iterative) with the trajectory engine, TE, to manage all the input uncertainties considered (meteorological plus, eventually, APM, initial conditions and aircraft intent related uncertainties) in a practical yet statistically sound way.

Figure 11:
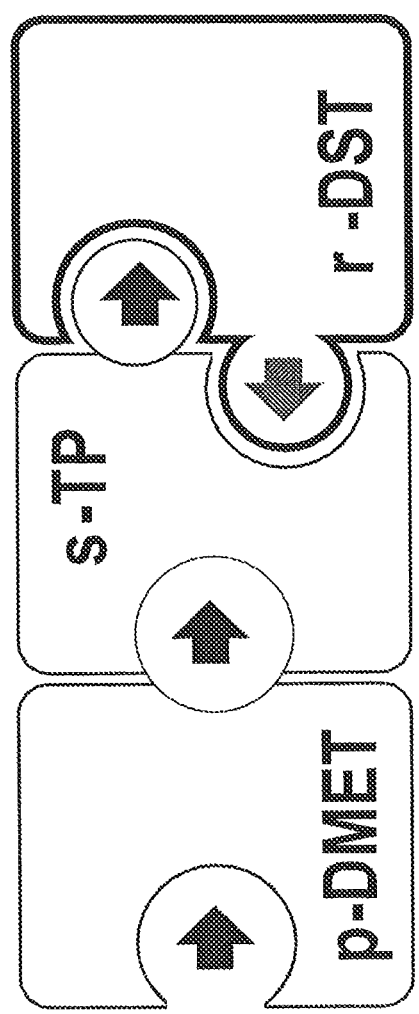
FIG. 11: shows key elements addressed.

The overall approach described within the present disclosure leads to the schematic representation of FIG. 11, which outlines the three key elements (chain of services) involved in decision making automation and the interactions among them.

The pattern represented in FIG. 11 is applicable to virtually any scenario of Air Traffic Management (ATM) automation, whether the decision support tool (DST) be ground-based or airborne, intended to support the planning or execution phases and regardless the level of autonomy in the decision making process (operator-based or fully autonomous).

As previously introduced, the disclosure also encompasses the statistical methodology to assess the TP uncertainty once the set of stochastic trajectories have been created after the TP process has been completed.

Regarding the robust Decision Support Tool unit (3), r-DST, this unit (3) is in charge of determining the following two aspects:
i) the so-called robust predicted trajectory (RPT), which is representative of a central value of the FOM population, given a certain trajectory selection criterion (TSC) that defines such a central value (centroid), e.g. the mean, the mode, the median or a given %-centile, and;
ii) the FOM population that corresponds to the trajectory sampling space (i.e. the given ensemble of trajectories), from which measures of FOM dispersion such as STD, MAE, SEE or RMS can be obtained.

Thus, the present disclosure provides a general methodology to find out the Robust Predicted Trajectory (RPT) and the associated population of FOM values (or other statistics of interest), given the definition of the FOM provided by the robust decision support tool unit (3), r-DST. More details about calculation of statistical parameters and handling of uncertainty parameters are provided below.

The sources of uncertainty regarding the Trajectory Prediction (TP) process can be summarized as follows:
The uncertainty in the definition of the trajectory to be computed (predicted);
The uncertainty associated to the forecasts of atmospheric conditions that are relevant to trajectory prediction, TP;
The key performance indicators (KPI's) that characterize the quality of the aircraft performance aspects involved in the computation of predicted trajectories;
The uncertainty associated with the observation of the initial conditions needed to initialize the trajectory computation process;
The fidelity of the motion model used by the trajectory engine unit (4), TE, to compute the trajectories Most current DST's rely on rather simplistic approaches to TP that barely consider such uncertainties. Some DST's simply ignore TP uncertainty, which leads to unreliable decisions. Other, simply allocate large buffers to cope with the unknown uncertainty in the specific aspect of interest, which leads to poor (often unacceptable) performance.

The main differences among existing solutions to the problem of trajectory prediction, TP, and the solution provided by the present disclosure arise from the following facts:
1.—The deterministic input information commonly used by existing DST's is replaced in the present case by stochastic inputs obtained from different uncertainty sources:
a. the deterministic atmospheric forecast provided by existing DMET services is replaced by the Atmospheric Forecast Ensembles (AFE's) provided by the new probabilistic digital meteorological service unit (2), p-DMET. This enables obtaining a measure of how meteorological uncertainty affects TP uncertainty. Moreover, the interfaces of the new probabilistic digital meteorological service unit (2), p-DMET, have been specifically designed to support the ensuing stochastic trajectory prediction processor unit (1), s-TP, for the purpose of robust decision making automation.
b. the input of the trajectory definition is also a key uncertainty source especially for the existing methods in which the trajectory definition depends on both the specific trajectory definition language used by the DST and the TP implementation. This methodology proposes the use of the potential benefits of the Aircraft Intent Description Language (AIDL) as an unambiguous formal language to describe aircraft trajectories agnostic to specific TP and DST implementations, which allows getting rid of the uncertainty associated to trajectory definition.

c. the rest of the uncertainty sources identified are less relevant compared with the two identified above (atmospheric forecasts and trajectory definition). Nevertheless, the methodology enables a mechanism to consider and understand how other minor uncertainties play, by means of the definition of certain randomization parameters which are provided by the trajectory engine unit, TE, as vectors of stochastic parameters associated with different components (APM, AI, IC, AM) for the current trajectory computation ($\delta_{APM}$, $\delta_{AI}$, $\delta_{IC}$, $\delta_{AM}$)

2.—The automation scheme of exiting decision making approaches carried out by the conventional "DMET"-"TP"-"DST" chain has been enhanced to extend functionality in the new "p-DMET"-"s-TP"-"r-DST" approach:

a. p-DMET: generic weather forecasts are widely available but specialized meteorological forecasting services customized for a trajectory-based context is novel.

b. s-TP: the stochastic rather than deterministic TP fed by probabilistic meteorological forecast is new in Air Traffic Management (ATM). The interaction between the stochastic trajectory prediction processor unit (1), s-TP, and robust decision support tool unit (3), r-DST, in terms of FOM and related uncertainty has been never approached.

The capability to manage uncertainty inputs and produce a stochastic trajectory prediction and its uncertainty measure in terms of FOM provides potential benefits to the making decision process of the robust decision support tool unit (3), r-DST.

c. r-DST: the use of customized figures of merit (FOM's) to characterize the uncertainty of TP for its exploitation in automated decision support is new compared to current state-of-the-art, where DST's relying on deterministic TP do not account for uncertainty. The analysis of the correlation between uncertainty in FOM measures and the DST performance has never been attempted before.

3.—The internal trajectory predictor infrastructure of exiting decision support automation is generally developed to fulfill the requirements of a specific tool. Furthermore, automation usually defines the aircraft trajectory to compute by means of a "proprietary description language". Thus, the exiting trajectory prediction relies on a solution that couples the specific TP implementation with the specific trajectory description of the DST. The use of an AIDL-based TP is also a novel idea that allows decoupling the trajectory definition and the specific TP implementation.

Thus, the present method and system are better than existing approaches to decision-making support because:

adopt AIDL to eliminate a major source of uncertainty, associated to trajectory definition;

consider additional information about the other major source of uncertainty, i.e. the forecast of atmospheric conditions, through the p-DMET approach;

propose a formal scheme (based on the FOM approach) that is agnostic to the specific aspects of predicted trajectories whose associated uncertainty is of the interest to the DST's;

improve robustness of the decision making process, because it considers the uncertainty when selecting the predicted trajectories that decisions are made upon and enables, additionally obtaining a measure of such uncertainty, which is exploited to make more sound decisions.

The present disclosure is specially valuable for Airspace users and Air Traffic Management/Unmanned Aerial Systems (ATM/UAS) services providers in the context of the future trajectory-based Aerial Vehicle (AV) operational environments. In particular, innovative decision-making techniques for flight planning, arrival management, sense & avoid and contingency landing in engine-out conditions, among others, could exploit stochastic trajectory prediction models based on meteorological ensemble forecasts in order to obtain more robust results than those provided by existing deterministic automation processes.

The method proposed might save cost in large operations of air carrier companies. The operational decisions based on stochastic approach are closer to the reality than those based on deterministic approaches and, therefore, it is easier to fit better the real cost of the operations (significant operational enhancements without compromising safety).

The following is a detailed discussion of the Trajectory Prediction (TP) process and its associated sources of TP uncertainty.

The mathematical problem that allows computing the trajectory of an Air Vehicle (AV) under reasonable assumptions that make operational sense in Air Traffic Management (ATM) is conventionally described by means of the following structure:

Equations of motion that govern the motion of the AV's center of gravity (three degrees of freedom, 3-DOF), subject to aerodynamic (L and D), propulsive (T) and gravitational (W) forces, within a 4D wind (w) field:

$$\frac{dv_{TAS}}{dt} - \frac{T-D-W\sin\gamma_{TAS}}{m} + \dot{w}_1^{WFS} = 0 \quad [E1]$$

$$\frac{d\gamma_{TAS}}{dt} - \frac{1}{v_{TAS}}\left[\frac{L\cos\mu_{TAS}-W\cos\gamma_{TAS}}{m} + (\dot{w}_3^{WFS}\cos\mu_{TAS}+\dot{w}_2^{WFS}\sin\mu_{TAS})\right] = 0$$

$$\frac{d\chi_{TAS}}{dt} - \frac{1}{v_{TAS}\cos\gamma_{TAS}}\left[\frac{L\sin\mu_{TAS}}{m} + (\dot{w}_3^{WFS}\sin\mu_{TAS}-\dot{w}_2^{WFS}\cos\mu_{TAS})\right] = 0$$

Mass variation equation based on a model of the fuel consumption (F):

$$\frac{dm}{dt} + F = 0 \quad [E2]$$

Navigation equations in ellipsoidal geometry defined by the local prime vertical (N) and meridian (M) radii of curvature:

$$\frac{d\lambda}{dt} - \frac{v_{TAS}\cos\gamma_{TAS}\sin\chi_{TAS}+w_2}{(N+h)\cos\varphi} = 0 \quad [E3]$$

-continued $$\frac{d\varphi}{dt} - \frac{v_{TAS}\cos\gamma_{TAS}\cos\chi_{TAS} + w_1}{(M+h)} = 0$$

$$\frac{dh}{dt} - v_{TAS}\sin\gamma_{TAS} = 0$$

AIDL motion instructions' effects, which close the 3 control degrees of freedom:

$$q_1(\lambda,\phi,h,m,v_{TAS},\chi_{TAS},\delta_T,\gamma_{TAS},\mu_{TAS},\delta,\theta,V,g,w_1^{WFS}, w_2^{WFS},w_3^{WFS},t)=0$$

$$q_2(\lambda,\phi,h,m,v_{TAS},\chi_{TAS},\delta_T,\gamma_{TAS},\mu_{TAS},\delta,\theta,V,g,w_1^{WFS}, w_2^{WFS},w_3^{WFS},t)=0$$

$$q_3(\lambda,\phi,h,m,v_{TAS},\chi_{TAS},\delta_T,\gamma_{TAS},\mu_{TAS},\delta,\theta,V,g,w_1^{WFS}, w_2^{WFS},w_3^{WFS},t)=0 \quad [E4]$$

AIDL configuration instructions' effects, which close the 4 configuration degrees of freedom:

$$d_1(\delta_{HL},\delta_{SB},\delta_{LG},\delta_{AR})=c_1(\lambda,\phi,h,m,v_{TAS},\chi_{TAS},\delta_T,\gamma_{TAS}, \mu_{TAS},\delta,\theta,V,g,w_1^{WFS},w_2^{WFS},w_3^{WFS},t)=0$$

$$d_2(\delta_{HL},\delta_{SB},\delta_{LG},\delta_{AR})=c_2(\lambda,\phi,h,m,v_{TAS},\chi_{TAS},\delta_T,\gamma_{TAS}, \mu_{TAS},\delta,\theta,V,g,w_1^{WFS},w_2^{WFS},w_3^{WFS},t)=0$$

$$d_3(\delta_{HL},\delta_{SB},\delta_{LG},\delta_{AR})=c_3(\lambda,\phi,h,m,v_{TAS},\chi_{TAS},\delta_T,\gamma_{TAS}, \mu_{TAS},\delta,\theta,V,g,w_1^{WFS},w_2^{WFS},w_3^{WFS},t)=0$$

$$d_4(\delta_{HL},\delta_{SB},\delta_{LG},\delta_{AR})=c_4(\lambda,\phi,h,m,v_{TAS},\chi_{TAS},\delta_T,\gamma_{TAS}, \mu_{TAS},\delta,\theta,V,g,w_1^{WFS},w_2^{WFS},w_3^{WFS},t)=0 \quad [E5]$$

Expressions [E1], [E2] and [E3] are differential equations while [E4] and [E5] represent algebraic constraints. All of them collectively make up a so called Differential Algebraic Equations (DAE) system, which, in compact notation can be rewritten as:

$$\dot{X}=F(X,u,\Delta,A,E,t) \text{ (from } [E1],[E2] \text{ and } [E3]) \quad [E6]$$

$$q(X,u,E,t)=0 \quad [E4]$$

$$d(\Delta)=c(X,E,t) \text{ (from } [E5]) \quad [E5]$$

Where the variables have been chosen according to the scheme reflected in the table shown in FIG. 15.

Equations [E4], [E5] and [E6] can be numerically solved for given initial conditions:

$$u(t_0)=u_0 \quad [E7]$$

$$X(t_0)=X_0 \quad [E8]$$

$$\dot{X}(t_0)=\dot{X}_0 \quad [E9]$$

which gives raise to the predicted trajectory, i.e. a discrete sequence of "n" samples of the state vector $X_j$, or, typically, an extended version of it $Y_j$ with additional information about motion, configuration, environmental and aircraft performance characteristics computed at each integration step j:

$$Y_j=\{X_j,u_j,\Delta_j,E_j\}\, j=\{0,\ldots,n\} \text{ Extended trajectory sample } j \quad [E10]$$

$$T=\{Y_j\} \text{ Extended trajectory} \quad [E11]$$

The definition of an AV trajectory in terms of AIDL (aircraft intent) ensures that the specific combination of equations [E4] and [E5] applicable over a given time interval called operation interval is known all along the trajectory. Thus, any trajectory can always be split into a sequence of operations, within each one, the problem of computing the corresponding trajectory segment is defined by such specific combination of motion and configuration instructions. Using the language analogy, a trajectory can be "said" as a sequence of "words" or "signs", each word being a combination of 7 "letters", which correspond to the 3 motion instructions plus the 4 configuration instructions applicable during the time interval for which the corresponding word defines the trajectory. Therefore, the problem of computing a trajectory underlies solving a sequence of differential equations, DAE problems, with the algebraic part being provided by AIDL and where the initial conditions for the next segment of the trajectory are taken from the end state of the previous segment computed.

The approach to AV trajectory computation presented relies on a 3-DOF (degrees of freedom) kinetic mass-varying Aircraft Performance Model (APM), which models aerodynamic and propulsive forces, as well as fuel consumption (involved in the computation of gravitational forces) as a function of the motion aspects and local environmental conditions (see table in FIG. 16).

$$A=A(X,E,u) \quad [E12]$$

Also, the environmental characteristics involved in the trajectory computation problem are provided via the so called Earth Model (EM), whose characteristics, depend, in general on local position and time (see table in FIG. 17), i.e.:

$$E=E(X,t) \quad [E13]$$

Figure 8:
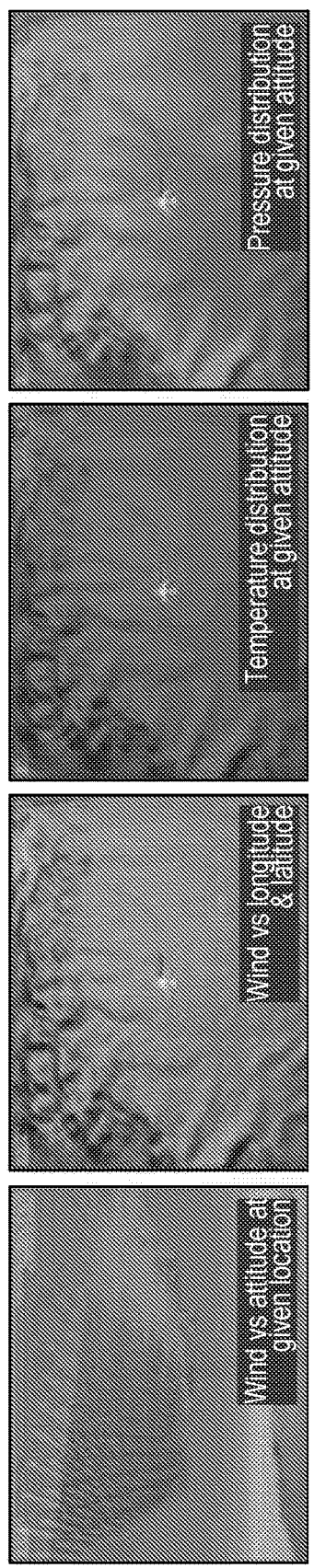
FIG. 8: shows typical 4D fields that characterize an atmospheric scenario used in TP (INSA).

The Earth Model, EM, can be split in two sub-models: the Geoid, which provides models for the geopotential and gravity, typically ellipsoidal ones, as a function of latitude and altitude and the so called "4D Atmosphere Model" (AM), which provides the atmosphere pressure, temperature and wind as a function of position and time (see FIG. 8).

While the Geoid model consists on a fairly straightforward standard formulation, the Atmosphere Model, AM, involves a whole technology domain related to Atmosphere/Weather sciences, Earth observation, Meteorological Forecast agencies, models, data validation and distribution, etc. that represents a major complexity beyond the scope of the Air Vehicle (AV) trajectory computation problem, indeed a major concern as far as TP uncertainty.

Thus, the Atmosphere Model (AM) is assumed to be coupled with an external service called DMET (or p-DMET in the probabilistic approach of the present disclosure), in charge of coping with the complexity associated to forecasting atmosphere conditions relevant to TP in a given geo-spatial and temporal domain.

As shown, the approach to AV trajectory computation presented handles much more information than just 4D or positions and time. In particular, FIG. 18 shows a table which reflects all the trajectory aspects considered.

As far as what is concerned on determining errors and metrics in trajectory prediction, any rigorous framework to study TP uncertainty requires defining what TP error means for the different trajectory aspects of potential interest to r-DST's, as well as establishing proper metrics to measure them.

Figure 12:
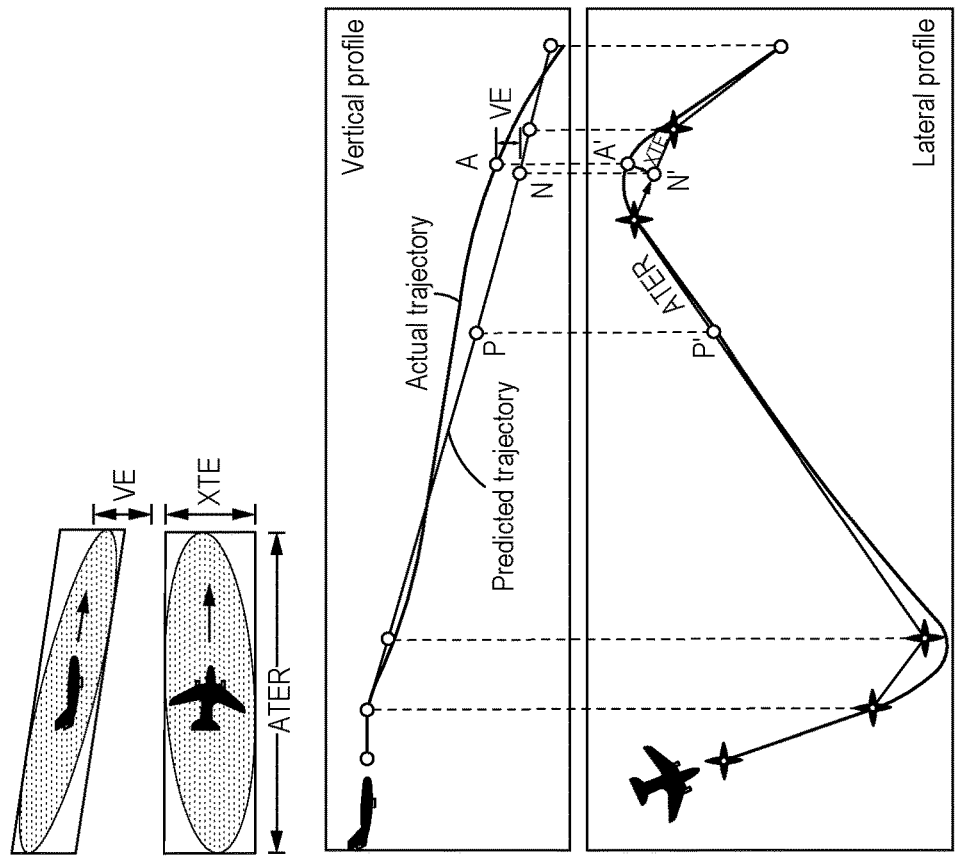
FIG. 12: shows a graphical representation of geometric TP errors.
Figure 12:
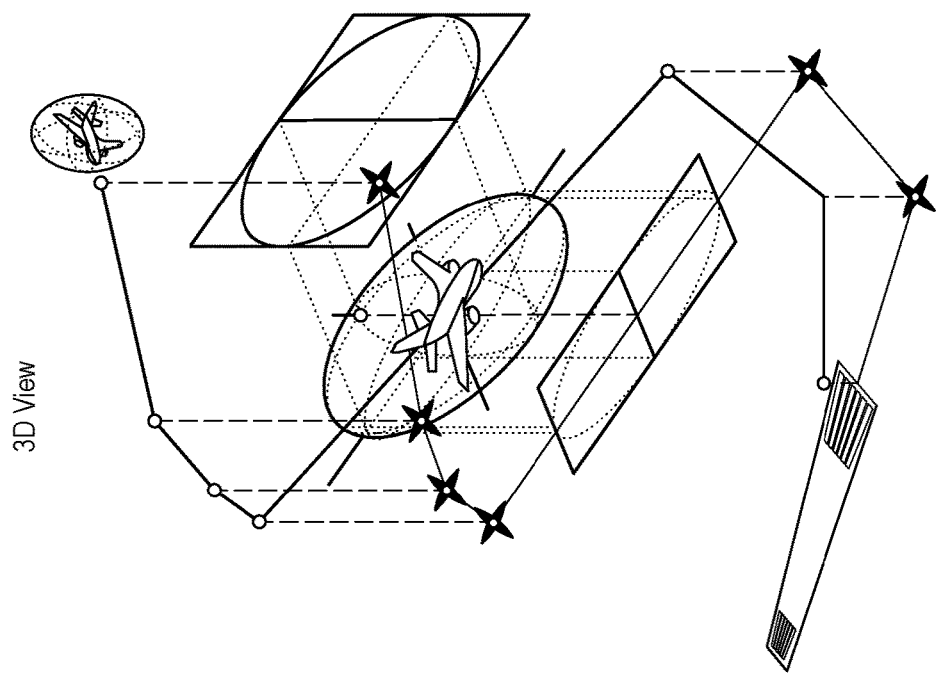

One type of errors is the so-called "4D errors". To start with, FIG. 12 is considered, which depicts a typical predicted trajectory and the aircraft at a given predicted position denoted as "P". Bearing in mind that there is uncertainty present, the actual position "A" of the aircraft at that same time instant is expected to differ from the predicted one, P. For this purpose, the concept of covariance ellipsoid is useful, an ellipsoid centered in P, which contains the actual position A with a given probability (e.g. one-sigma, two-sigma, etc.). The idea is to bind such a volume by means of a simple approach, i.e. a sort of box whose 3 dimensions bring a measure of the geometric TP errors: along track error in distance (ATER), cross-track error (XTE) and vertical error (VE). FIG. 12 represents the concept, which commonly involves the following three positions (see table in FIG. 19).

In effect, to link the predicted, P, and actual, A, positions at time "t", which are time-coincident, it is needed to find out a third position "N", called "nominal position", which is the spatially-correspondent to A, over the predicted trajectory, i.e. the nearest predicted position corresponding to the actual one. Thus, to connect P and A, it is needed to move an amount ATER along the predicted track until N is reached, then an amount XTE in cross-track direction, plus an amount VE in the vertical direction. N corresponds to a time instant other than t and such time difference is the so-called along track error in time (ATET).

The table shown in FIG. 20 shows the TP errors defined so far along with their metrics, based on 4D trajectory aspects, where the metric for XTE requires further explanation as follows.

Let N' and A' be the footprint of, respectively N and A over the reference (ellipsoidal) surface, i.e. the points of geodetic coordinates $[\lambda^N, \phi^N, 0]$ and $[\lambda^A, \phi^A, 0]$, respectively. For small errors, the norm of the vector $\overrightarrow{N'A'}$ approximates the geodetic distance between N' and A', so its $2^{nd}$ component in the reference system TND is, thus, a good approximation of the XTE.

The TND reference system is defined as:
- $X_1^{TND}$ is oriented along the horizontal component of the ground speed $v_H$ at point N tangent to the lateral path.
- $X_2^{TND}$ is obtained by a clock-wise rotation of $\pi/2$ of $X_1^{TND}$ over the local plane tangent to the reference surface at N'—normal to the lateral path.
- $X_3^{TND}$ points to nadir (down) so the 3 axes form a right-hand oriented Cartesian system.

Figure 13:
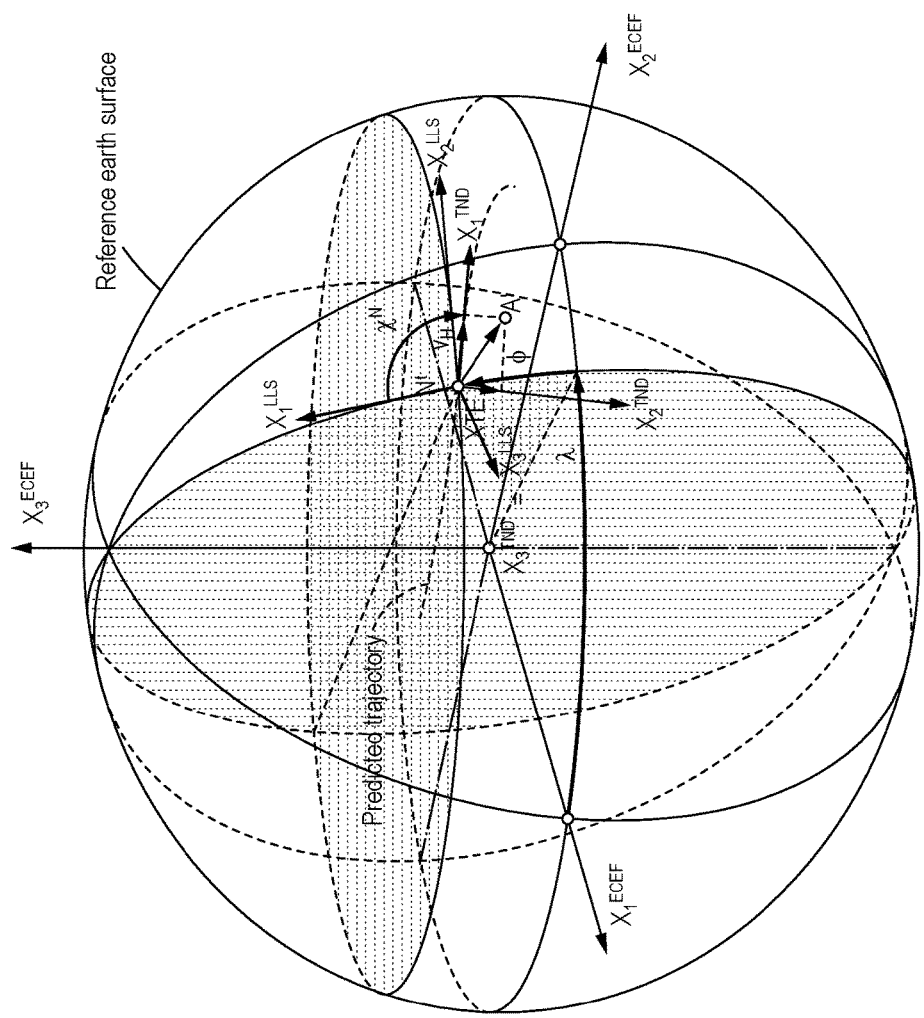
FIG. 13: shows reference systems involved in the computation of XTE metric.

As depicted in FIG. 13, the TND system results from a rotation of magnitude $\chi^N$ of the LLS (local level system) at N' around its $3^{rd}$ axis $x_3^{LLS}$, $\chi^N$ being the geodetic (true) bearing of the predicted trajectory at point N.

The vector $\overrightarrow{N'A'}$ can be expressed in the Earth-Centered-Earth-Fixed (ECEF) reference system as follows:

$$\overrightarrow{N'A'}_{ECEF} = \begin{bmatrix} N(\cos\varphi^A \cos\lambda^A - \cos\varphi^N \cos\lambda^N) \\ N(\cos\varphi^A \sin\lambda^A - \cos\varphi^N \sin\lambda^N) \\ N(1-e^2)(\sin\varphi^A - \sin\varphi^N) \end{bmatrix} \quad [E14]$$

N and "e" respectively being the radius of curvature in the prime vertical and the eccentricity of the reference ellipsoid.

Such a vector, expressed in the LLS results as:

$$\overrightarrow{E'A'}^{LLS} = R_2\left(-\frac{\pi}{2} - \varphi^N\right) R_3(\lambda^N) \overrightarrow{E'A'}^{ECEF} \quad [E15]$$

wherein the matrices $R_3$ and $R_2$ represent consecutive conventional elemental rotations around axes 3 then around 2.

Finally, the vector $\overrightarrow{N'A'}$ can be expressed in the TND system as:

$$\overrightarrow{N'A'}^{TND} = R_3(\chi^N) \overrightarrow{N'A'}^{LLS} \quad [E16]$$

Once the 4D TP error metrics have been defined, additional TP error metrics, as attitude, speed or fuel consumption errors, can be developed, associated to other trajectory aspects, as represented in the table shown in FIG. 21.

Speed error metrics can be adapted to different speed types, such as IAS, CAS, GS or MACH. Similarly, Attitude error metrics can be adapted to ground reference, either magnetic or true, instead of aerodynamic reference.

Finally, it is interesting to define additional metrics that exploit actual observations of atmospheric properties obtained along the actual trajectory, which can be used to assess the accuracy of predicted atmospheric conditions.

The table of FIG. 22 shows such additional error concepts and metrics associated to the atmosphere model (AM).

The table of FIG. 23 shows a non-comprehensive list of typical trajectory-related systems (DST's), typical trajectory-related functions that they deal with, and trajectory-related aspects that such functions operate upon. Although each trajectory-related DST, in principle, combines trajectory-related functionality in specific ways as required by their business objectives, a lot of commonality can be identified among current DST's in use or future ones being advocated within different commercial and military applications both in the ATM and UAS domains.

A fundamental design premise of the AIDL technology is to enable a common infrastructure capable of supporting, ideally, any trajectory-related function so a big extent of the functionality of any trajectory-related DST can be realized and likely improved through the combination of a set of primitive standard trajectory-related functions.

As already explained, most DST's somehow rely on TP at some stage to support a sort of what-if analysis, which ultimately sustains their decision-making process. Thus, when introducing uncertainty in TP, it is paramount to conceive an approach that holds enough generality for a TP infrastructure to serve to as much DST's as possible.

In effect, when considering an ensemble "W" of forecast atmospheric scenarios $W_i$ assumed to "reasonably" capture the possible evolution of atmospheric conditions within a 4D domain of interest, this can be characterized by $[\lambda_1, \lambda_2] \times [\phi_1, \phi_2] \times [h_1, h_2] \times [t_1, t_2]$:

$$W = \{W_i\} \; i = \{1, \ldots, q\} \quad [E17]$$

Despite the term "reasonably" may sound unclear, falling under the scope of the p-DMET technology, the key point here is that, although most probably the actual atmospheric scenario will not end up matching any of the elements of W, the range of conditions covered by its elements brings a measure of the uncertainty associated with the forecast.

Given W, a corresponding ensemble T of possible predicted trajectories $T_i$ can be obtained, each one computed based on the corresponding atmosphere scenario $W_i$, the rest of inputs being the same for all the "q" instances:

$$T = \{T_i\} \; i = \{1, \ldots, q\} \quad [E18]$$

For some applications, the DST is interested in assessing a figure of merit (FOM) of a single trajectory, which, considering the "q" possible atmospheric scenarios, gives rise to a population of possible FOM values:

$$FOM_i = f(T_i) \; i = \{1, \ldots, q\} \quad [E19]$$

In this case, the DST requires: a) selecting one of the trajectories (i=R) out of T, which is representative of a central value of the FOM population in the sense of the mean, the mode, the median, a %-centile, or other statistical measure, and; b) obtaining the dispersion of the FOM associated to the rest of trajectories with regard to the selected one.

Examples of FOM's in this case are:

Fuel burnt: $\Delta m = m_n - m_0$

Arrival time at given fix (flight time): $\Delta t = t_n - t_0$

Cost index (time cost vs. fuel cost): $CI \cdot \Delta t - \Box \Delta m$

Range (horizontal distance covered): $\Delta r = r_n - r_0$ 2D position at given time or fix $(\lambda_n, \phi_n)$ or over a trajectory segment (ATER, XTE)

Altitude at given time or fix $(h_n)$ or over a trajectory segment (VE)

3D position at given time or fix $(\lambda_n, \phi_n, h_n)$ or over a trajectory segment (ATER, XTE, VE)

4D position at given time or fix $(\lambda_n, \phi_n, h_n, t_n)$ or over a trajectory segment (ATER, XTE, VE, ATET)

Speed at given fix $(v_{TAS,n})$ or over a trajectory segment (SE)

Attitude $(\chi_{TAS,n}, \mu_{TAS,n}, \gamma_{TAS,n})$ at given fix or over a trajectory segment (BE, PAE, BAE)

Wake vortex at given time or fix: function of speed (vTAS), configuration $(\delta_{HL}{}^k, \delta_{SB}{}^k, \delta_{LG}{}^k)$ and wind $(w^k)$ In other applications, the DST is interested in an aggregate figure of merit of a set of trajectories "S", which are evaluated simultaneously:

$$S = \{T_i^k\} \; k=\{1, \ldots, s\} \; i=\{1, \ldots, q\} \quad [E20]$$

$$FOM_i = f(T_i^1, T_i^2, \ldots, T_i^s) \; i=\{1, \ldots, q\} \quad [E21]$$

The FOM in this case is a function of multiple trajectories. For any possible atmosphere scenario $W_i$, the set of corresponding trajectories adopt a specific form, which brings a specific overall $FOM_i$.

Again, the DST in this case requires: a) selecting the index i=R of the scenario that brings about the specific set of robust predicted trajectories that best represents a central value of the FOM population, and; b) obtaining the dispersion of the FOM associated to the rest of scenarios with regard to the selected one.

Examples of FOM's in this case are typically associated to traffic or a fleet of vehicles, e.g.:

Fuel burnt: $\Sigma \Delta m^k = \Sigma(m_n{}^k - m_0{}^k)$ for $k=\{1, \ldots, s\}$ Noise: function of position $(ATER^k, XTE^k, VE^k)$, thrust $(T^k)$, configuration $(\delta_{HL}{}^k, \delta_{SB}{}^k, \delta_{LG}{}^k)$ and wind $(w^k)$ Emissions: function of fuel burnt and wind Conflictivity: number of loss LOS events multiplied by the probability of LOS (function of $ATER^k$, $XTE^k$ and $VE^k$)

The tables of FIGS. 24a and 24b qualitative draw the relationships between a representative set of DST's considered and the FOM's that they hold (or might potentially hold) interest on, for the sake of their decision-making processes.

As shown in the tables of FIGS. 24a and 24b, two different sub-cases can be distinguished, depending on whether the DST is only interested in assessing the FOM at the end point of the trajectory, or all over the whole trajectory.

As already indicated, any trajectory-based r-DST is interested in, essentially, two elements:

a) the so-called robust predicted trajectory (RPT), which is representative of a central value of the FOM population, given a certain trajectory selection criterion that defines such a central value (centroid), e.g. the mean, the mode, the median or a given %-centile, and;

b) the FOM population that corresponds to the trajectory sampling space (i.e. the given ensemble of trajectories), from which measures of FOM dispersion such as STD, MAE, SEE or RMS can be obtained.

The following is a presentation of a general methodology to find out the robust predicted trajectory (RPT) in the sense described, along with the associated population of FOM values, given the definition of the FOM provided by the robust decision support tool unit (3), r-DST. For the sake of simplicity, it is considered that the only source of uncertainty in TP comes from the atmospheric forecast, i.e. the aircraft intent expressed in AIDL, the initial conditions (IC) and the aircraft performance model (APM) remain invariant, while the atmospheric scenario $W_i$ can be any of the members of the ensemble W (see equation [E17]).

The methodology presented below refers to the single trajectory case already introduced, rather than to the multiple trajectory case. As indicated above, two sub-cases are distinguished:

a) Merit at the End Point:

In this case the application of the given FOM function to each of the trajectories $\{T_i\}$ of the ensemble T gives rise to a population of FOM values denoted as:

$$z_i = FOM(T_i) \; i=\{1, q\} \quad [E22]$$

$$z = \{z_i\} = [z_1, z_2, \ldots, z_q]^T \quad [E23]$$

where, in the examples surveyed, the FOM adopts the forms depicted in the table of FIG. 25. In order to select a representative central value of the FOM population, a trajectory selection criterion (TSC) must be provided by the robust decision support tool unit (3), r-DST. The table of FIG. 26 shows the most typical criteria used in Statistics to derive central measures of a statistical variable.

By applying the TSC to the population of FOM values, the corresponding central measure, $z_C$ can be obtained as:

$$z_C = TSC(z) \quad [E24]$$

Since it is unlikely that the computed $z_C$ matches any of the values of the population z, the closest one is selected as the most representative of the central measure.

Considering the Following Equations $$\epsilon_i = z_i - z_C \; i=\{1, \ldots, q\} \quad [E25]$$

$$\epsilon = \{\epsilon_i\} = [z_1, z_2, \ldots, z_q]^T \quad [E26]$$

an expression of the population of the differences between computed FOM values $z_i$ and the central measure $z_C$, the lowest one in absolute value can be denoted as:

$$\epsilon_R = [\min\{\epsilon_i^2\}]^{1/2} \; R \in \{1, \ldots, q\} \quad [E27]$$

which defines the index R that identifies the trajectory $T_R$ of the ensemble whose associated FOM is closest to the central value $z_C$, i.e. the robust predicted trajectory, RPT:

$$T_R = T[R] \quad [E28]$$

$$z_R = FOM(T_R) = z[R] \quad [E29]$$

Once the RPT has been found, the population of FOM deviations with respect to the so-called centroid $z_R$ can be expressed as:

$$e_i = z_i - z_R \; i=\{1, \ldots, q\} \quad [E30]$$

$$e = \{e_i\} = [e_1, e_2, \ldots, e_q]^T \quad [E31]$$

which is expected to represent the population of FOM dispersion, should the actual atmospheric conditions differ from the scenario $W_R$ chosen to compute the RPT.

From the population "e", any statistical measure of dispersion that makes sense to the robust decision support tool unit (3), r-DST, can be obtained. The table of FIG. 27 shows the most typical ones.

b) Merit of the Whole Trajectory:

The approach described above can be generalized to the case in which the r-DST is not only interested in assessing uncertainty of trajectory aspects at a given fix or time instant, but all over the whole trajectory. Such is the case when assessing variables such as probabilistic Area Navigation (p-RNAV) conformance of trajectory geometry or continuous time/speed guidance.

Examples of typical FOM's of interest in this case are shown in the table of FIG. 28.

In this case, a further degree of freedom (DOF) plays role associated to the index j, which identifies every single sample $Y_j$, of each of the trajectories $T_i$ of the ensemble.

Because of this, the given FOM is not used directly, but a corresponding figure (denoted as "z" in FIG. 28) is applied instead at trajectory-sample level to obtain a population of trajectory-sample level FOM's as follows:

$$z_{ij} = FOM(Y_{ij})$$
$$i = \{1, \ldots, q\}$$
$$j = \{1, \ldots, n\}$$
$$z = \{z_{ij}\} = \begin{bmatrix} z_{11} & \cdots & z_{1n} \\ \vdots & \ddots & \vdots \\ z_{q1} & \cdots & z_{qn} \end{bmatrix}$$

Expressions [E32] and [E33] assume that all the trajectories that belong to the ensemble considered have the same number of state vector samples.

Now, the TSC is applied column-wise over the population of z, so the central value $z_{Cj}$ is obtained for each set of corresponding trajectory samples:

$$z_{Cj} = TSC(z_{ij}) \; j = \{1, \ldots, n\} \quad [E34]$$

$$z_C = \{z_{Cj}\} = [z_{C1}, z_{C2}, \ldots, z_{Cn}]^T \quad [E35]$$

Considering the equations:

$$\sigma_{ij} = z_{ij} - z_{Cj}$$
$$i = \{1, \ldots, q\}$$
$$j = \{1, \ldots, n\}$$
$$\sigma = \{\sigma_{ij}\} = \begin{bmatrix} \sigma_{11} & \cdots & \sigma_{1n} \\ \vdots & \ddots & \vdots \\ \sigma_{q1} & \cdots & z\sigma_{qn} \end{bmatrix}$$

as an expression of the population of the differences between computed trajectory-sample level FOM values $z_{ij}$ and the central measure $z_{Cj}$, the lowest one in absolute value can be denoted as:

$$\Box_R = [\min\{\Sigma_{j=1}^n \sigma_{ij}^2\}]^{1/2} \; R \in \{1, \ldots, q\} \quad [E38]$$

Which defines the index R that identifies the trajectory $T_R$ of the ensemble whose associated FOM is closest to the central value $z_C$, i.e. the robust predicted trajectory, RPT:

$$T_R = T[R] \quad [E39]$$

And the centroid, which in this case is the n-dimensional value:

$$z_R = (z_{Rj}) = [z_{R1}, z_{R2}, \ldots, z_{Rn}]^T \quad [E40]$$

Once the RPT has been found, the population of FOM deviations with respect to centroid $z_R$ can be expressed as:

$$e_{ij} = z_{ij} - z_{Rj}$$
$$i = \{1, \ldots, q\}$$
$$j = \{1, \ldots, n\}$$
$$e = \{e_{ij}\} = \begin{bmatrix} e_{11} & \cdots & e_{1n} \\ \vdots & \ddots & \vdots \\ e_{q1} & \cdots & e_{qn} \end{bmatrix}$$

And from this point on, FOM dispersion measures can be derived from the population "e", following an analogous approach to the one described in the previous considered case (merit at end point).

The following is a brief description that approaches the architecture of a test bed based on the premises set up over the above described method, which is intended to support the stochastic analyses of different trajectory aspects as required to run many different study cases.

With the aim to provide a broad view of the architecture, the following description presents both a static view of its main logical components as well as a dynamic view that details the main interactions among them.

Figure 14:
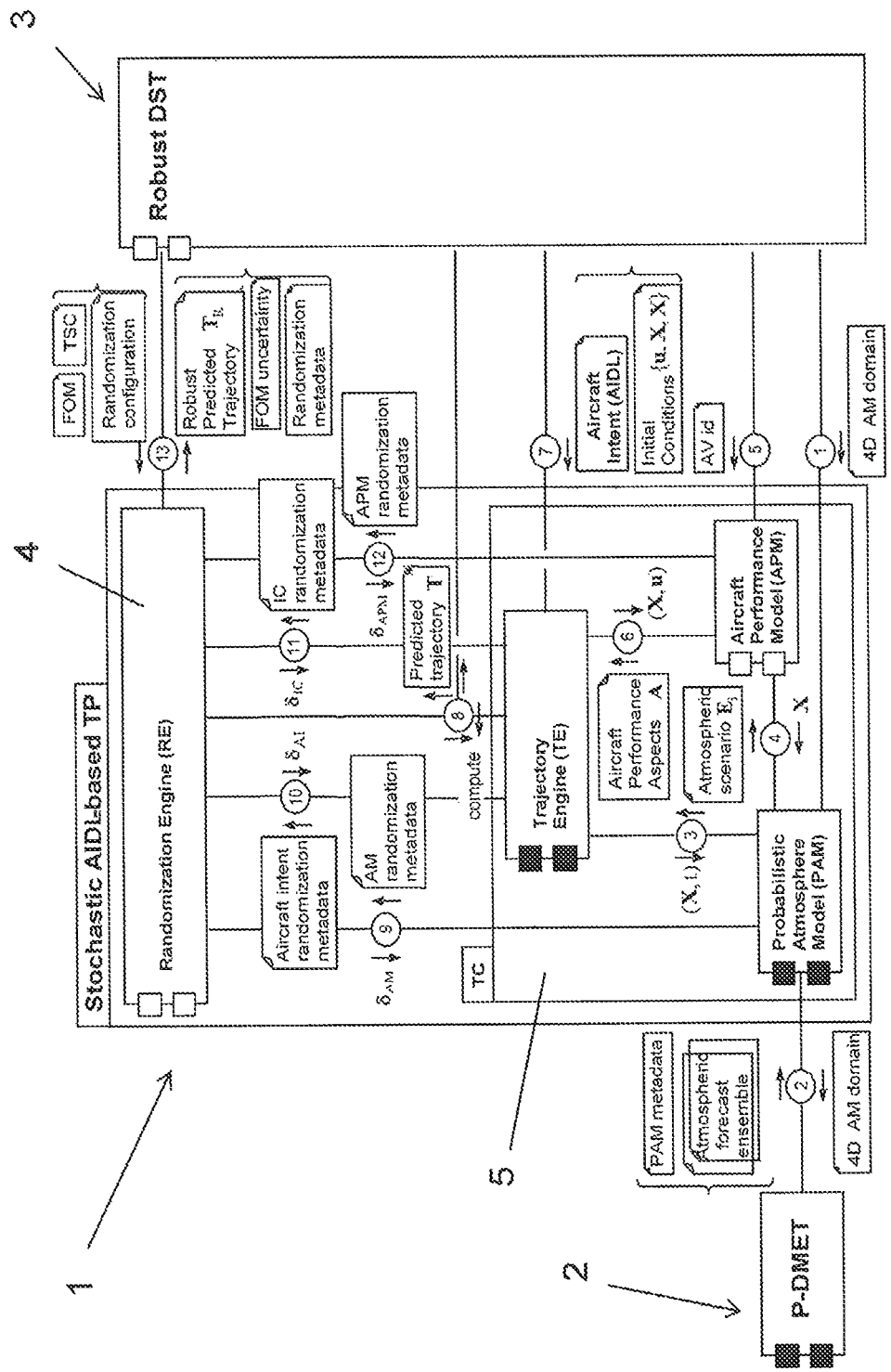
FIG. 14: shows a test bed high-level logical architecture and interfaces.

FIG. 14 shows the overall test bed logical architecture, including its three main systems (r-DST, s-TP and p-DMET) and the subsystems of its central piece, which is the stochastic trajectory prediction processor unit (1), s-TP.

The main functions of the systems/subsystems identified in the diagram of FIG. 14 along with their interfaces, are subsequently explained.

a) Robust DST Unit (3), r-DST:

In general, existing DST's base their decision making process on Trajectory Predictors (TP), typically an internal component developed ad-hoc, which rely on a single (deterministic) predicted trajectory for each set of inputs such as AV type, trajectory definition and atmospheric scenario.

The architecture proposed maintains this functionality, though the TP is featured as an external AIDL-based trajectory computation (TC) infrastructure. Interfaces 1, 5, 7 and 8 shown in FIG. 14, allow the DST to, respectively, setup the 4D domain for which an AM is needed, select the AV type, provide the aircraft intent and request/retrieve the predicted trajectory.

The concept of Robust-DST considered here, however, differs from the existing DST's in that new mechanisms are enabled to allow the robust decision support tool unit (3), r-DST, base its decision making process on additional information about the sensitivity of predicted trajectories to aspects that are known to be uncertain. Furthermore, such mechanisms allow the robust decision support tool unit (3), r-DST, to select the specific aspects of the predicted trajectory whose uncertainty is relevant to the decision making process.

The new functionality is realized through interface 13 of FIG. 14, which allows the robust decision support tool unit (3), r-DST, providing the stochastic trajectory prediction processor unit (1), s-TP, with the FOM of interest, Trajectory Selection Criteria (TSC), and configuration information on how to randomize stochastic variables involved in the (stochastic) TC process, so the stochastic trajectory prediction processor unit (1), s-TP, returns the robust predicted trajectory (RPT) and FOM uncertainty computed accordingly. Interface 13 of FIG. 14 also provides the robust decision support tool unit (3), r-DST, with metadata related to s-TP randomization capabilities; essentially the parameters that can be randomized, the range of values that they can adopt and a measure of the complexity involved in the computation for the given randomization configuration.

The tables of FIGS. 29a and 29b provide further details on the interactions between the robust decision support tool unit (3), r-DST, and the stochastic trajectory prediction processor unit (1), s-TP.

b) Stochastic AIDL-based Trajectory Prediction Processor Unit (1), s-TP:

The stochastic trajectory prediction processor unit (1), s-TP, is made up by two main components, represented in FIG. 14 as Randomization Engine unit (4), RE, and Trajectory Computation unit (5), TC. Essentially, the approach is based on Monte Carlo simulation. Thus the randomization engine unit (4), RE, works iteratively with the underlying trajectory computation unit (5), TC, which computes one trajectory for each combination of all the stochastic variables selected by the randomization engine unit (4), RE. After the stochastic variables playing in the randomization process have taken all their possible values, which is designed by the robust decision support tool unit (3), r-DST, the randomization engine unit (4), RE, collects all "possible" predicted trajectories and performs the FOM analysis explained above (single trajectory and multiple trajectory analysis) or a similarly generalized one, should the stochastic variables considered differ from the case above.

Randomization Engine Unit (4), RE:

The randomization engine unit (4), RE, realizes the functionality of the stochastic trajectory prediction processor unit (1), s-TP, through interface 13 described above. To that end, the randomization engine unit (4), RE, interacts through interfaces 8, 9, 10, 11 and 12 with the underlying trajectory computation unit (5), TC, as described in the tables of FIGS. 30a and 30b.

The randomization engine unit (4), RE, is in charge of building up the randomization sequence, which typically consists on a series of nested loops, each one associated with one single stochastic parameter sweeping its corresponding range in steps selected by the randomization engine unit (4), RE, to appropriately handle the computational complexity. Every time that one specific combination is made, the randomization engine unit (4), RE, calls interface 8 and retrieves the predicted trajectory associated to such combination. When it finishes sweeping all the stochastic parameters' ranges, the randomization engine unit (4), RE, switches to perform the analysis explained above.

Trajectory Computation Unit (5), TC:

The trajectory computation unit (5), TC, is the component in charge of computing a predicted trajectory for each set of inputs, including given values to the stochastic parameters involved. Thus, though stochastic parameters are handled through its interfaces with the randomization engine unit (4), RE, the trajectory computation unit (5), TC, works in a deterministic manner. Its main elements are the trajectory engine (TE), aircraft performance model (APM) and probabilistic atmosphere model (PAM). The table of FIG. 31 describes the interfaces among them.

c) Probabilistic Digital Meteorological Service Unit (2), p-DMET:

The probabilistic digital meteorological service unit (2), p-DMET, of the system of the present disclosure, is in charge of providing the stochastic trajectory prediction processor unit (1), s-TP, with the probabilistic atmospheric forecasts based on the ensemble approach proposed. To that end, it interacts with the trajectory computation unit (5), TC's internal component PAM, through interface 2, whose high-level design is outlined in the table of FIG. 32.

The present method and system are innovative, compared to current state of the art, because:

1) It involves an unprecedented combination of capabilities and areas of expertise (meteorological forecasting, meteorological services, trajectory prediction and management, bulk data processing and air traffic operations);
2) It focuses on meteorological forecast uncertainty, combined with other uncertainty sources, propagated throughout the airplane trajectory's end-to-end life cycle, with the aim to thoroughly understand and quantify their final effect on user operational decisions;
3) The method specifies metrics (in terms of FOM's or equivalent aggregated parameters) characterizing the uncertainty related to current state-of-the-art products for Air Traffic Management (ATM) decision support, and hence a measurement of the operational benefit of future products;

In particular, the three main research units contain a number of specific innovative aspects:

Regarding the probabilistic digital meteorological service unit (2), p-DMET:

4) Although generic weather forecasts are widely available, specialized meteorological forecasting products/services customized to airline and ATM operations in a trajectory-based context are not available;
5) Meteorological forecast uncertainty is extracted from an ensemble of models and conditions run by three different organizations with consolidated experience in the area, ensuring wide scope results;

Regarding the stochastic trajectory prediction processor unit (1), s-TP:

6) The stochastic rather than deterministic TP fed by probabilistic meteorological forecasts is new in Air Traffic Management (ATM);
7) The interaction between the stochastic trajectory prediction processor unit (1), s-TP, and the robust decision support tool unit (3), r-DST, in terms of FOM and related uncertainty has been never approached;

Regarding the robust decision support tool unit (3), r-DST:

8) The use of customized FOM's to characterize the uncertainty of TP for its exploitation in automated decision support is new compared to current state-of-the-art, where DST's relying on deterministic TP do not account for uncertainty;
9) The analysis of the correlation between uncertainty in FOM measures and DST performance has never been attempted before.

A sensitivity analysis to outline the requirements that need to be fulfilled by meteorological models underlying TP-based DST's to effectively support SESAR (Single European Sky ATM Research) objectives has never been conducted so far.

The invention claimed is:

1. A method for defining and predicting aircraft trajectories, for use in flight management of an aircraft, which comprises:
   a. acquiring input data of both aircraft performance characteristics and atmospheric data, and
   b. defining trajectory parameters to which the aircraft trajectory must be subjected,
   characterized in that:
      aircraft trajectory parameters are defined by means of a specific Aircraft Intent Description Language, which is constituted by specific signs, wherein each segment of the aircraft trajectory is described by each sign of the Aircraft Intent Description Language, wherein each specific combination of signs of the Aircraft Intent Description Language completely describes a whole trajectory;

atmospheric data is acquired in the form of a plurality of atmospheric forecast ensembles, each atmospheric forecast within an atmospheric forecast ensemble expressing a determined weather scenario with an associated probability;

wherein the method further comprises:

c. calculating a predicted trajectory from each atmospheric forecast of an atmospheric forecast ensemble, said predicted trajectory having associated information regarding a certain figure of merit of the aircraft trajectory;

wherein an ensemble of predicted trajectories is obtained from each atmospheric forecast ensemble, each predicted trajectory of the ensemble of predicted trajectories having an associated probability derived from the probability of each atmospheric forecast within an atmospheric forecast ensemble;

d. selecting a specific figure of merit of each aircraft predicted trajectory;

e. determining, for each predicted trajectory within an ensemble of predicted trajectories, the value of the selected figure of merit;

f. calculating, according to a predetermined statistical criterion, a statistical value of the selected figure of merit, said calculated statistical value representing, according to the selected figure of merit, all the predicted trajectories within each ensemble of predicted trajectories; wherein said calculating includes at least one criterion for the calculation of an associated uncertainty with which a chosen predicted trajectory represents a central statistical value of a certain figure of merit;

g. determining the predicted trajectory, from each ensemble of predicted trajectories, whose value for the selected figure of merit, is closer to the previously calculated statistical value of the selected figure of merit;

h. calculating, according to a predetermined statistical criterion, the dispersion of values for the selected figure of merit, with respect to the calculated statistical value of the selected figure of merit for all the predicted trajectories of each ensemble of predicted trajectories, and i. utilizing a selected predicted trajectory in flight management of an aircraft in at least one segment of a flight.

2. The method for defining and predicting aircraft trajectories according to claim 1, characterized in that it comprises:

a. selecting a specific figure of merit of each aircraft predicted trajectory;

b. determining, for each predicted trajectory within an ensemble of predicted trajectories, the value of the selected figure of merit;

c. calculating, according to a predetermined statistical criterion, a statistical value of the selected figure of merit, said calculated statistical value representing, according to the selected figure of merit, all the predicted trajectories within each ensemble of predicted trajectories;

d. determining the predicted trajectory, from each ensemble of predicted trajectories, whose value for the selected figure of merit, is closer to the previously calculated statistical value of the selected figure of merit;

e. calculating, according to a predetermined statistical criterion, the dispersion of values for the selected figure of merit, with respect to the calculated statistical value of the selected figure of merit for all the predicted trajectories of each ensemble of predicted trajectories.

3. The method for defining and predicting aircraft trajectories according to claim 2, characterized in that it comprises selecting a predicted trajectory, from among the calculated predicted trajectories, said selected predicted trajectory best meeting predetermined trajectory selection criteria.

4. The method for defining and predicting aircraft trajectories according to claim 1, characterized in that each of said specific signs of the Aircraft Intent Description Language is made up by the combination of at least three trajectory restrictions and four configuration instructions, wherein all the degrees of freedom of the aircraft trajectory are coped by imposing the three trajectory restrictions, thus the aircraft trajectory being completely defined by imposing the three trajectory restrictions, these restrictions selected from among at least the following:

i. longitude;
ii. latitude;
iii. altitude;
iv. true airspeed;
v. bearing;
vi. throttle;
vii. path angle;
viii. bank angle;
ix. high lift;
x. speed brakes.

5. The method for defining and predicting aircraft trajectories according to claim 1, characterized in that said figure of merit is selected from at least:

i. fuel burnt;
ii. arrival time at given fix;
iii. cost index;
iv. Range of horizontal distance covered;
v. 2D position at given time;
vi. 2D position at a given fix;
vii. 2D position over a trajectory segment;
viii. altitude at given time;
ix. altitude at a given fix;
x. altitude over a trajectory segment;
xi. 3D position at given time;
xii. 3D position at a given fix;
xiii. 3D position over over a trajectory segment;
xiv. 4D position at given time;
xv. 4D position at a given fix;
xvi. 4D position over a trajectory segment;
xvii. speed at given fix;
xviii. speed over a trajectory segment;
xix. attitude at given fix;
xx. attitude over a trajectory segment;
xxi. wake vortex at given time;
xxii. wake vortex at a given fix.

6. A system for defining and predicting aircraft trajectories, for use in flight management of an aircraft, characterized in that it comprises:

a. a processor unit, configured to calculating predicted trajectories for each segment of an aircraft flight utilizing a specific Aircraft Intent Description Language, each calculated predicted trajectory being calculated based on stochastic input data, therefore each calculated predicted trajectory being stochastic and having an associated probability, the input data selected from at least the following:
i. Aircraft Performance Model parameters;
ii. atmospheric forecasts;
b. a probabilistic Digital Meteorological Service unit, being configured to provide the processor unit for calculating predicted trajectories with the input of an ensemble of atmospheric forecasts;
c. a robust Decision Support Tool unit, being configured for:
i. providing the processor unit configured to calculating predicted trajectories with input data necessary for predicting trajectories, and;
ii. selecting a predicted trajectory from among the predicted trajectories calculated by the processor unit configured to calculating predicted trajectories;
d. characterized in that the robust decision support tool unit defines:
i. a predetermined flight trajectory including one or more parameters which define the flight trajectory, by means of imposing a combination of three trajectory restriction parameters for each segment of the flight trajectory;
ii. an aircraft performance model including one or more parameters which define aircraft response upon external conditions;
iii. parameters related to aircraft initial conditions at beginning of a segment of the flight trajectory;
iv. a set of parameters defining at least one figure of merit of a predicted trajectory calculated by the processor unit configured to calculating predicted trajectories;
v. at least one criterion to choose a predicted trajectory from among at least one ensemble of predicted trajectories calculated by the processor unit for calculating predicted trajectories, this at least one criterion based on searching which predicted trajectory best represents a central statistical value of a certain figure of merit;
vi. at least one criterion for the calculation of an associated uncertainty with which a chosen predicted trajectory represents a central statistical value of a certain figure of merit;
wherein the selected predicted trajectory is utilized by a flight management system in guidance of an aircraft in at least one segment of a flight.

7. The system for defining and predicting aircraft trajectories according to claim 6, characterized in that the probabilistic digital meteorological service unit defines:
a. an atmospheric model domain including one or more parameters that define a region enclosing the volume of airspace in which the flight trajectory lies;
b. an atmospheric model providing multiple atmospheric scenarios of atmospheric parameters relevant to the airspace, said scenarios forming ensembles of atmospheric forecasts.

8. The system for defining and predicting aircraft trajectories according to claim 6, characterized in that the robust decision support tool unit defines:
a. a predetermined flight trajectory including one or more parameters which define the flight trajectory, by means of imposing a combination of three trajectory restriction parameters for each segment of the flight trajectory;
b. an aircraft performance model including one or more parameters which define aircraft response upon external conditions;

c. parameters related to aircraft initial conditions at beginning of a segment of the flight trajectory;
d. a set of parameters defining at least one figure of merit of a predicted trajectory calculated by the processor unit configured to calculating predicted trajectories;
e. at least one criterion to choose a predicted trajectory from among at least one ensemble of predicted trajectories calculated by the processor unit configured to calculating predicted trajectories, this at least one criterion based on searching which predicted trajectory best represents a central statistical value of a certain figure of merit;
f. at least one criterion for the calculation of an associated uncertainty with which a chosen predicted trajectory represents a central statistical value of a certain figure of merit.

9. The system for defining and predicting aircraft trajectories according to claim 6, characterized in that the processor unit configured to calculating predicted trajectories:
a. determines a set of parameters from among the input parameters provided by the robust decision support tool unit, which are considered stochastic, thus these set of parameters being subjected to uncertainty;
b. determines type and range of uncertainty of the stochastic set of parameters.

10. The system for defining and predicting aircraft trajectories according to claim 6, characterized in that the processor unit configured to calculating predicted trajectories:
a. determines, based on parameters for the atmospheric model, aircraft performance model, flight trajectory description, and initial conditions, a data set representing a predicted trajectory;
b. assigns values, with respective ranges of uncertainty, to the parameters to be made stochastic, to create a plurality of possible instances of the data set representing the predicted trajectory;
c. calculates, based on the ensemble of atmospheric forecasts, an ensemble of predicted trajectories, each calculated predicted trajectory based on a corresponding atmosphere scenario;
d. assesses at least one figure of merit of each predicted trajectory within an ensemble of predicted trajectories, to obtain a population of values of these figures of merit;
e. identifies, according to a certain statistical criterion, a predicted trajectory within each ensemble of predicted trajectories, that represents a central value of the at least one figure of merit assessed;
f. obtains, according to a certain statistical criterion, a dispersion of the values of the at least one figure of merit assessed, associated with the remaining trajectories of the ensemble of predicted trajectories, with regard to the predicted trajectory identified in the previous phase.

11. The system for defining and predicting aircraft trajectories according to claim 10, characterized in that the processor unit configured to calculating predicted trajectories comprises at least:
a. a randomization engine unit, for assigning values to the parameters to be made stochastic, received from the probabilistic digital meteorological service unit and the robust decision support tool unit;
b. a trajectory computation unit, for calculating predicted trajectories based upon input data provided by the randomization engine unit.

* * * * *